(12) United States Patent
Spencer et al.

(10) Patent No.: US 9,555,960 B2
(45) Date of Patent: Jan. 31, 2017

(54) TRANSPORT TANK

(71) Applicant: FERUS INC., Calgary (CA)

(72) Inventors: Brian E. Spencer, Sacramento, CA (US); Zachary B. Spencer, Sacramento, CA (US); Travis Balaski, Calgary (CA)

(73) Assignee: FERUS INC., Calgary (CA)

( * ) Notice: Subject to any disclaimer, the term of this patent is extended or adjusted under 35 U.S.C. 154(b) by 0 days.

(21) Appl. No.: 14/591,668

(22) Filed: Jan. 7, 2015

(65) Prior Publication Data
US 2015/0114971 A1 Apr. 30, 2015

Related U.S. Application Data

(62) Division of application No. 13/811,604, filed as application No. PCT/US2011/045934 on Jul. 29, 2011, now Pat. No. 8,960,484.

(60) Provisional application No. 61/369,298, filed on Jul. 30, 2010.

(51) Int. Cl.
*B60P 3/22* (2006.01)
*B65D 88/12* (2006.01)
*B65D 88/06* (2006.01)
*B65D 90/10* (2006.01)
*B65D 90/54* (2006.01)
(Continued)

(52) U.S. Cl.
CPC .............. *B65D 88/128* (2013.01); *B60P 3/22* (2013.01); *B60P 3/226* (2013.01); *B60P 3/2245* (2013.01); *B65D 88/06* (2013.01); *B65D 90/10* (2013.01); *B65D 90/54* (2013.01); *F16B 33/004* (2013.01); *F16B 43/001* (2013.01)

(58) Field of Classification Search
CPC ............. F16C 6/00; F16C 5/00; F16B 43/001; F16B 33/004; B65D 88/128; B65D 88/13; B65D 77/06; B65D 88/12; B60P 3/22; B60P 3/228; B60P 3/2265; B60P 3/226; B60P 3/2255; B60P 3/225; B60P 3/224; B60P 3/2245; F17C 6/00; F17C 5/00
IPC ......... B65D 88/128, 88/13, 77/06, 88/12; B60P 3/22, 3/228, 3/2265, 3/226, 3/2255, 3/225, 3/224, 3/2245
See application file for complete search history.

(56) References Cited

U.S. PATENT DOCUMENTS

| 1,689,575 | A | | 10/1928 | Winn | |
| 2,630,236 | A | * | 3/1953 | Arkoosh | ................ B60P 3/221 220/530 |
| 2,943,870 | A | | 7/1960 | Davis | |

(Continued)

FOREIGN PATENT DOCUMENTS

DE 202008013293 U1 3/2010
EP 0601774 A2 6/1994
(Continued)

*Primary Examiner* — Anthony Stashick
*Assistant Examiner* — Mollie Impink
(74) *Attorney, Agent, or Firm* — Bennett Jones LLP

(57) ABSTRACT

A transport tank for mounting to a truck has a composite tank body, an outer boss mounted to an outer side of the tank body, an inner boss mounted to an inner side f the tank body, and a flange disposed such that at least a portion of the inner boss is disposed between and abuts the inner side of the tank body and the flange. The tank body, the inner boss, the outer boss and the flange each have an aperture defined therein. The flange is fastened such that the outer boss, the tank body, and the inner boss are compressed by the flange.

12 Claims, 29 Drawing Sheets

(51) Int. Cl.
 *F16B 33/00* (2006.01)
 *F16B 43/00* (2006.01)

(56) References Cited

U.S. PATENT DOCUMENTS

| | | | |
|---|---|---|---|
| 3,019,832 A | | 2/1962 | Williams |
| 3,774,802 A | * | 11/1973 | O'Cheskey .............. B01J 3/002 138/30 |
| 4,304,526 A | | 12/1981 | Shetler, Sr. |
| 4,448,447 A | | 5/1984 | Funk et al. |
| 4,614,279 A | * | 9/1986 | Toth ...................... B29C 53/602 156/173 |
| 5,180,190 A | | 1/1993 | Kersey et al. |
| 5,217,140 A | * | 6/1993 | Lindahl ............... B29C 33/0016 220/4.06 |
| 6,758,625 B1 | * | 7/2004 | Lawrence .............. E06B 3/5436 403/388 |
| 8,292,115 B2 | | 10/2012 | Kobayashi et al. |
| 8,328,240 B2 | * | 12/2012 | Stone ...................... F16L 41/14 285/139.1 |
| 2003/0057212 A1 | | 3/2003 | Fish et al. |

FOREIGN PATENT DOCUMENTS

| | | | |
|---|---|---|---|
| FR | 1529814 | A | 6/1968 |
| GB | 229673 | A | 6/1925 |
| WO | WO 2012/016164 | A1 | 2/2012 |
| WO | WO 2012/016171 | A2 | 2/2012 |

* cited by examiner

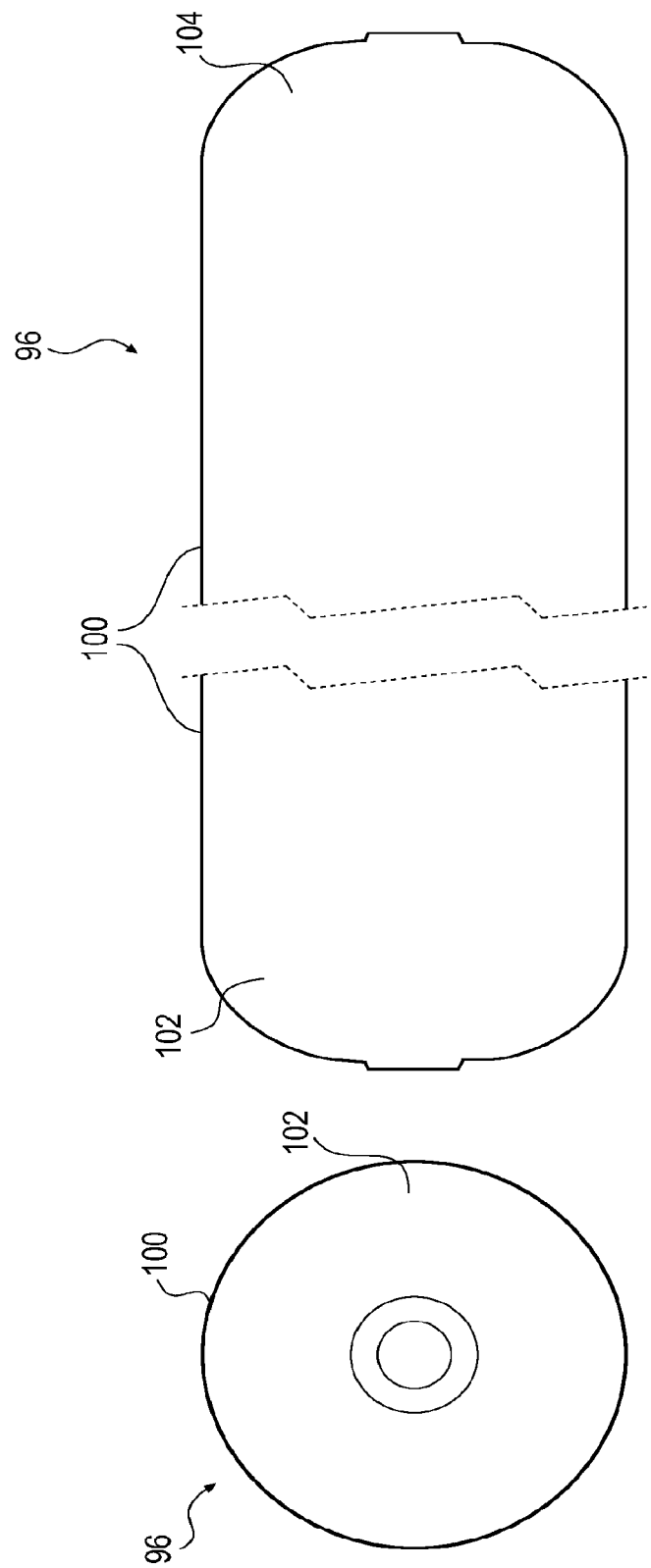

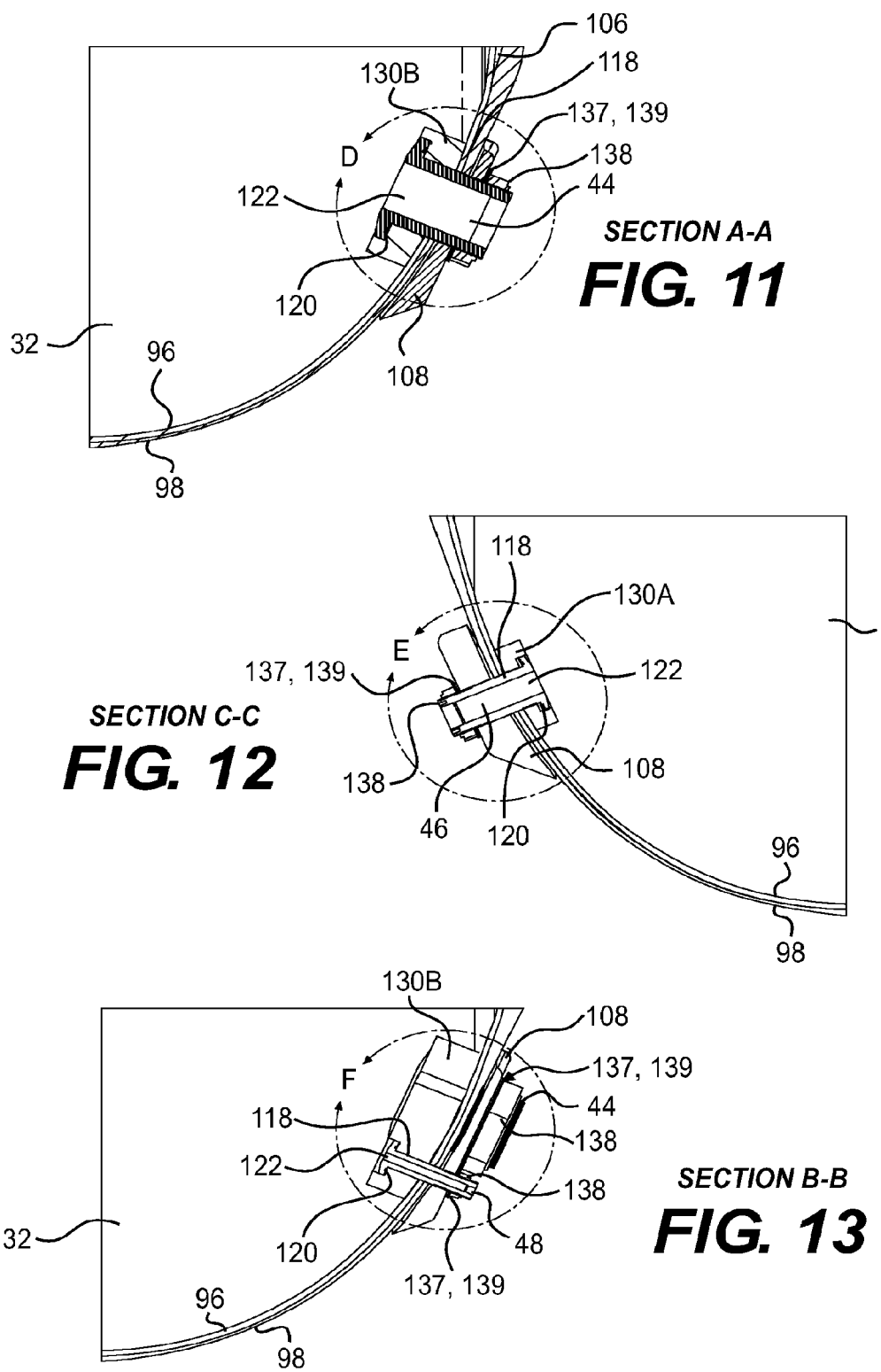

DETAIL D

DETAIL E

DETAIL F

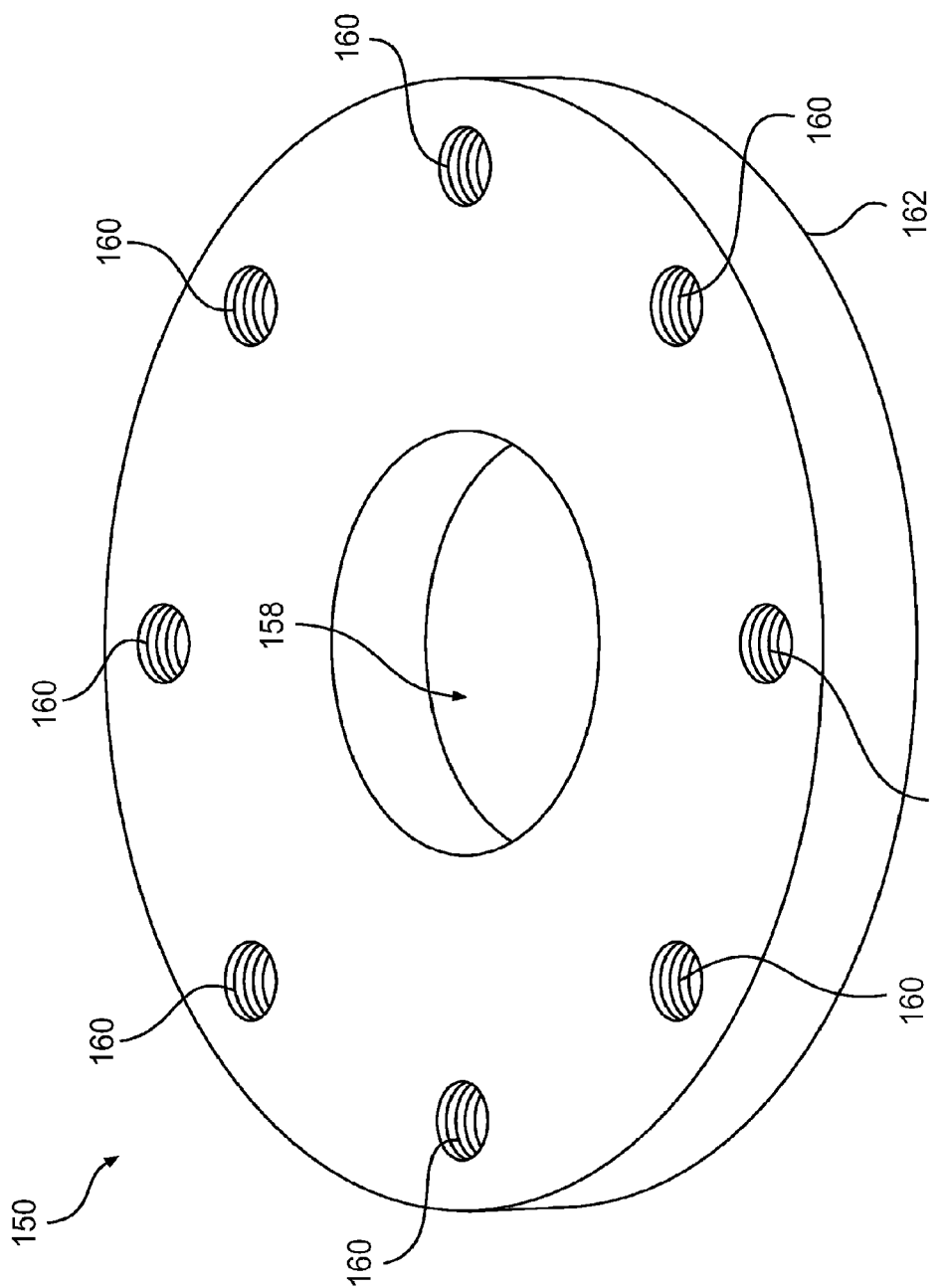

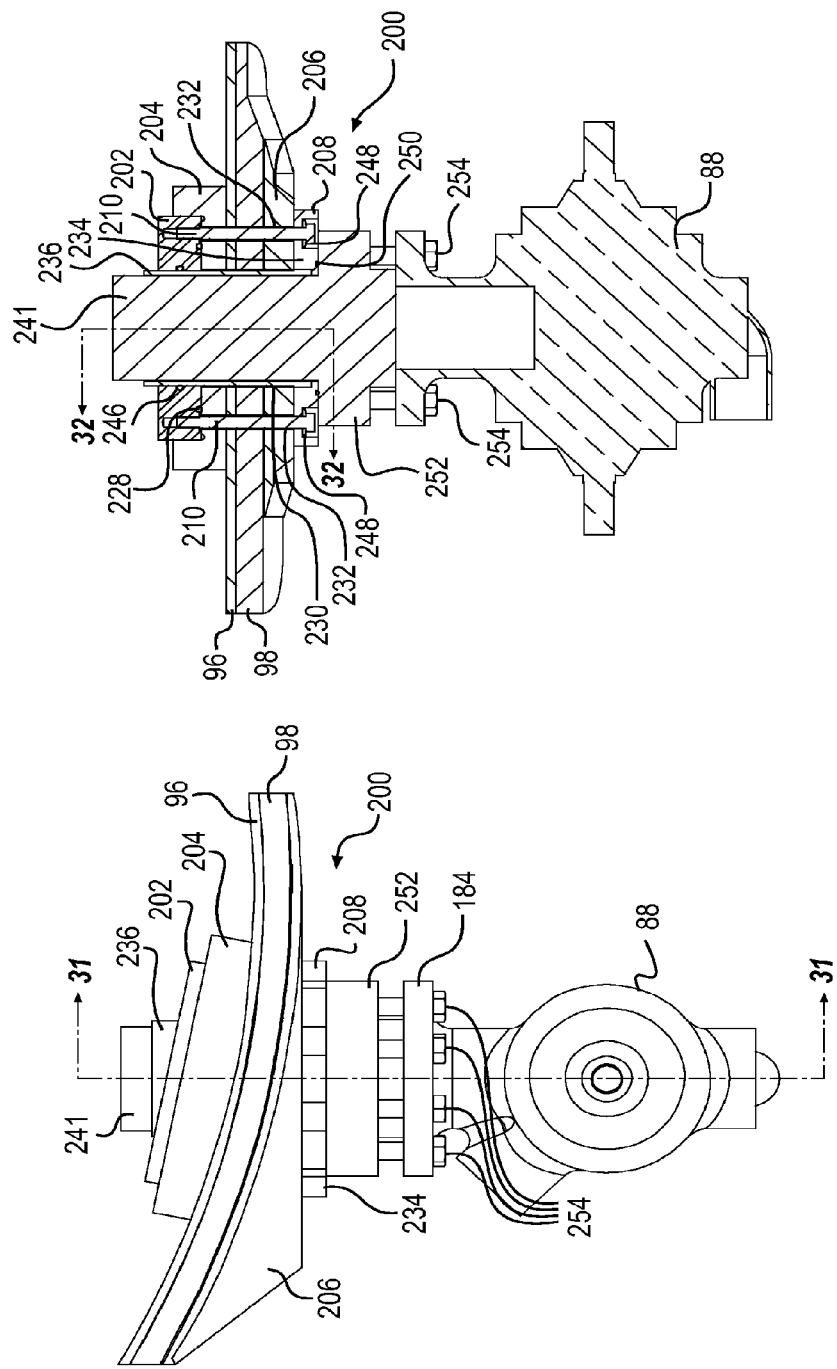

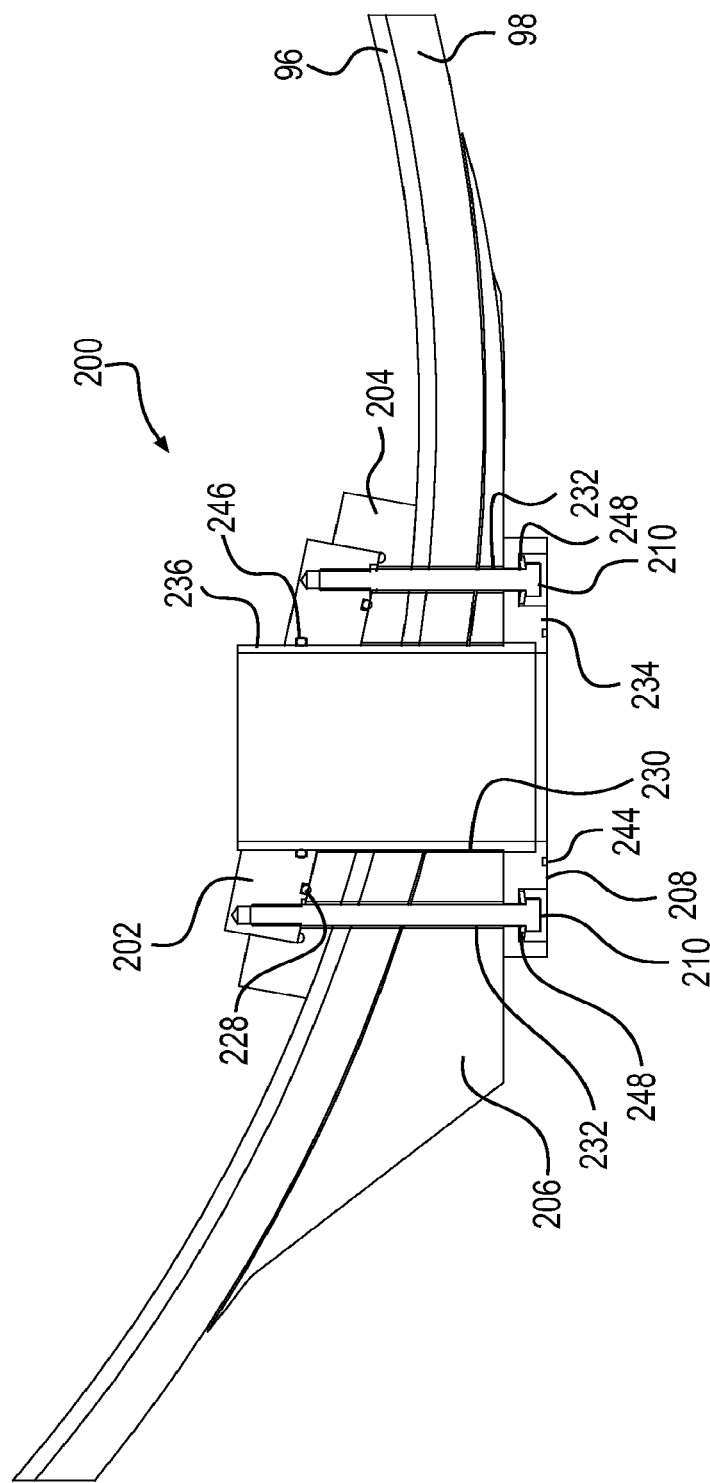

TRANSPORT TANK

CROSS-REFERENCE

The present application claims priority to U.S. Provisional Patent Application No. 61/369,298, filed Jul. 30, 2010, the entirety of which is incorporated herein by reference.

FIELD OF THE INVENTION

The present invention relates to transport tanks for mounting to trucks.

BACKGROUND

Many industries use trucks for the transportation of their goods. To transport a liquid, a truck is provided with a transport tank mounted to a frame of the truck or to a trailer of the truck. When the liquid is to be transported under pressure, the transport tank needs to be constructed to withstand this pressure. One example of such a liquid is a liquefied petroleum gas, such as propane. Typically, in order to withstand internal pressures, transport tanks are made of metal, such as carbon or stainless steel, and have a cylindrical central section and two generally curved ends. Although metal transport tanks such as the one described above are suitable for the transport of pressurized liquids they have some drawbacks.

In most jurisdictions, the total truck weight (truck plus payload) or total trailer weight (trailer plus payload) is not allowed to exceed a predetermined maximum weight. As a metal transport tank is heavy, the maximum weight of the payload that can be transported is less than could otherwise be transported if the transport tank was lighter. Also, a metal transport tank tends to corrode over time which requires maintenance, repair, and in some cases replacement of the tank.

One solution to at least some of the above-mentioned drawbacks of metal transport tanks consist is making the transport tank out of composite material. For tanks of the same volume, composite transport tanks are lighter than metal transport tanks. As a result, by using a composite transport tank the maximum weight of the payload that can be transported can be increased. Also, composite materials are typically less susceptible to corrosion than metals.

In order to fill and empty a transport tank, a number of features are provided on the tank body to permit the attachment of pipes and pumps. Similar features are also provided to permit the attachment of various gauges providing information such as internal temperature and pressure of the transport tank.

In metal transport tanks, apertures are made inside the tank body and fittings made of metal, such as steel, are inserted into the apertures. The fittings are then welded to the tank body, which simultaneously connects the fittings to the tank body and provides a seal between the fittings and the tank body.

However, in composite transport tanks this arrangement cannot be used. As would be understood, metal fittings cannot be welded to a composite material tank body. Furthermore, metals and composite materials have different material properties which means that they have different allowable stresses and different thermal coefficients of expansion. As such, providing a connection and a seal between a metal fitting and a composite tank body cannot be achieved in the same manner as in a metal transport tank. Additionally, cutting an aperture into a composite tank body creates a stress concentration in the material adjacent to the aperture due to loadings and internal tank pressure, thus weakening the transport tank in the area of the aperture.

Therefore, there is a need for a transport tank for mounting to a truck which is made of composite material and provides at least one feature for connecting at least one of a pipe, a pump, a gauge or other element to the tank.

SUMMARY

It is an object of the present to ameliorate at least some of the inconveniences present in the prior art.

In one aspect, a transport tank for mounting to a truck has a composite tank body, an outer boss mounted to an outer side of the tank body, an inner boss mounted to an inner side of the tank body, and a flange disposed such that at least a portion of the inner boss is disposed between and abuts the inner side of the tank body and the flange. The tank body, the inner boss, the outer boss and the flange each have an aperture defined therein. The flange is fastened such that the outer boss, the tank body, and the inner boss are compressed by the flange.

In an additional aspect, the flange is connected to a fitting body and forms a fitting therewith. An end of the fitting body extends outside the tank body and is at least partially threaded. A nut is fastened onto the at least partially threaded end of the fitting body such that the outer boss, the tank body, and the inner boss are compressed between the nut and the flange.

In another aspect, a plurality of threaded fasteners extends in the outer boss, the tank body, the inner boss and the flange. The plurality of threaded fasteners engages threads of additional apertures in the flange such that the outer boss, the tank body, and the inner boss are compressed between heads of the plurality of threaded fasteners and the flange.

For purposes of this application, the adjective "composite", such as in "composite tank body", indicates that the associated element is made at least in part of composite materials. Examples of composite materials include, but are not limited to, carbon fibers with epoxy resin and aramid fibers with acrylate-based resin. The nominal pipe size (NPS) refers to the North American set of standard pipe sizes for pipes. It should be noted that the NPS of a pipe does not always correspond to the outer diameter of the pipe. The equivalent European designation for pipe sizes, which is DN (for "diametre nominal", or nominal diameter), will also be provided.

Embodiments of the present invention each have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 6 is a rear elevation view of a liner of the transport tank of FIG. 2;

FIG. 7 is a right side elevation view of the liner of FIG. 6;

FIG. 11 is a cross-sectional view of the rear end of the transport tank of FIG. 2 taken through line A-A of FIG. 5;

FIG. 12 is a cross-sectional view of the rear end of the transport tank of FIG. 2 taken through line C-C of FIG. 5;

FIG. 13 is a cross-sectional view of the rear end of the transport tank of FIG. 2 taken through line B-B of FIG. 5;

FIG. 26 is a perspective view of a flange of the pump mounting assembly of FIG. 24;

FIG. 30 is a front elevation view of an alternative embodiment of a pump and pump mounting assembly of the transport tank of FIG. 2;

FIG. 31 is a cross-sectional view of the pump and pump mounting assembly of FIG. 30 taken through line 31-31 of FIG. 30;

FIG. 32 is a cross-sectional view of the pump mounting assembly of FIG. 30 taken through line 32-32 of FIG. 31;

DETAILED DESCRIPTION

Figure 1:
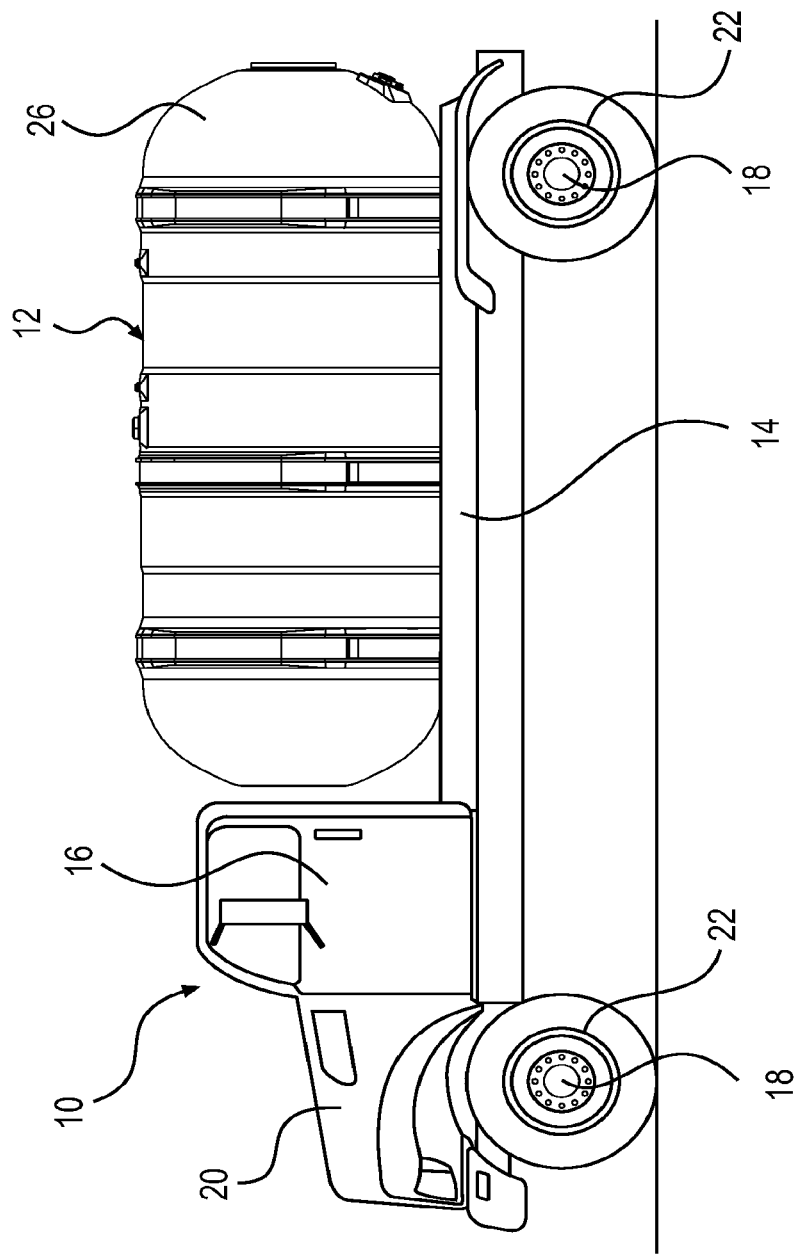
FIG. 1 is a left side elevation view of a truck having a transport tank.

A truck 10 having a transport tank 12 in accordance with aspects of the present invention will be described with respect to FIG. 1. The truck 10 has a frame 14 to which a cabin 16, two axles 18, an engine (not shown), and the tank 12 are connected. The engine is covered by a hood 20. The engine drives at least one of the two axles 18. A plurality of wheels 22 are mounted to the axles 14. It is contemplated that the truck 10 could have more than two axles 18.

Figure 2:
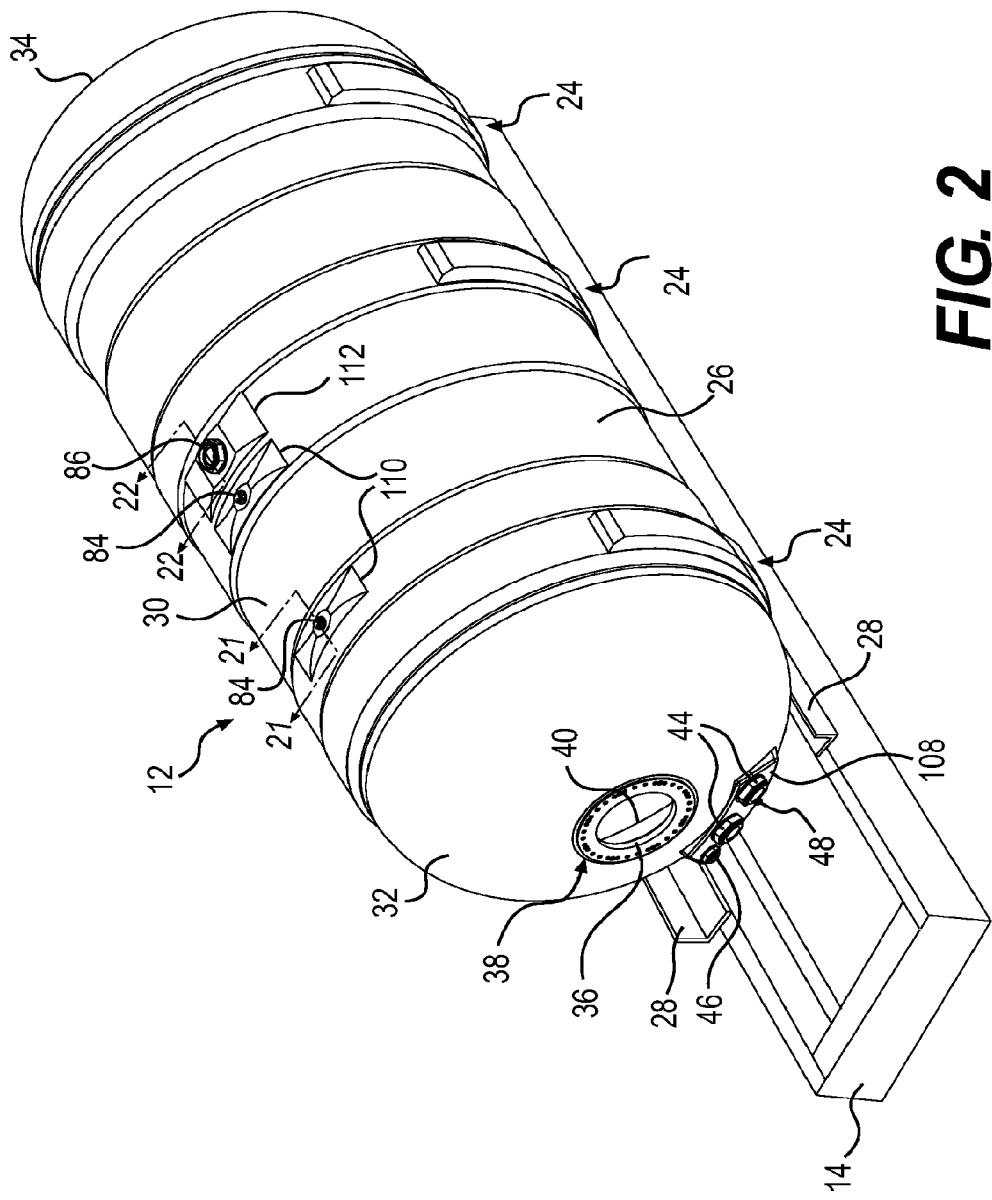
FIG. 2 is a perspective view taken from a rear, right side of the transport tank and a portion of a frame of the truck of FIG. 1.

As seen in FIG. 2, the tank 12 is connected to the frame 14 of the truck 10 via three cradles 24. It is contemplated that more or less than three cradles 24 could be used. The cradles 24 are bonded to an outer side of a body 26 of the tank 12. Two L-bars 28 are connected to the cradles 24 and are fastened to the frame 14. It is contemplated that the cradles 24 could alternatively be fastened or otherwise connected to the tank 12. It is also contemplated that the cradles 24 could be connected to the frame 14 by other means, such as by welding the cradles 24 directly to the frame 14.

It is contemplated that the truck 10 could have a flatbed mounted to the frame 14. In such an embodiment, the tank 12 would be mounted to the flatbed. It is also contemplated that the tank 12 could be mounted to a truck of a different type than the truck 10 shown in FIG. 1. For example, the truck could be a tractor-trailer consisting of a tractor and of a full trailer or semitrailer hooked to the tractor. In such an embodiment, the tank would be mounted to the full trailer or semitrailer.

Figure 3:
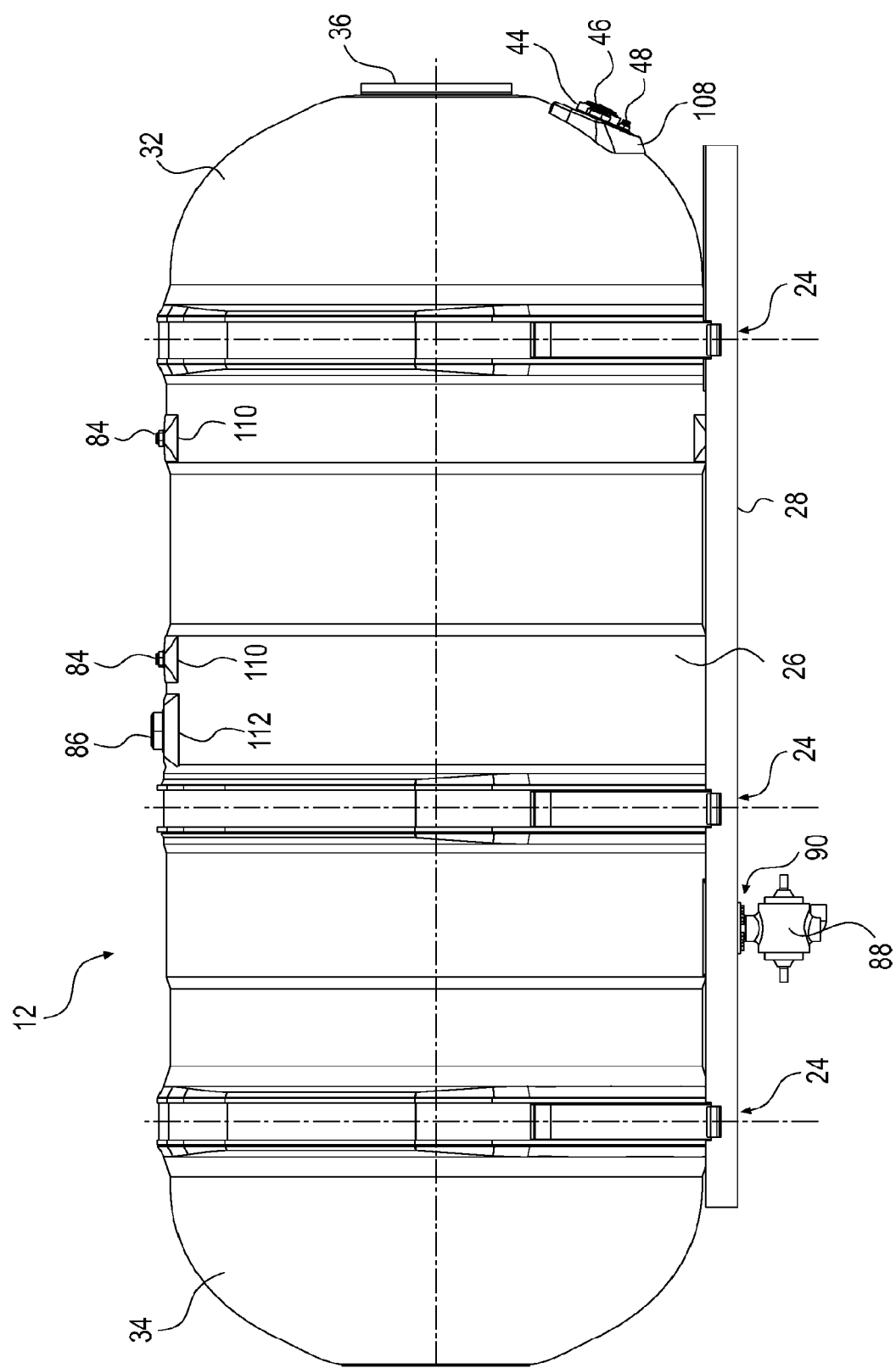
FIG. 3 is a left side elevation view of the transport tank of FIG. 2.
Figure 4:
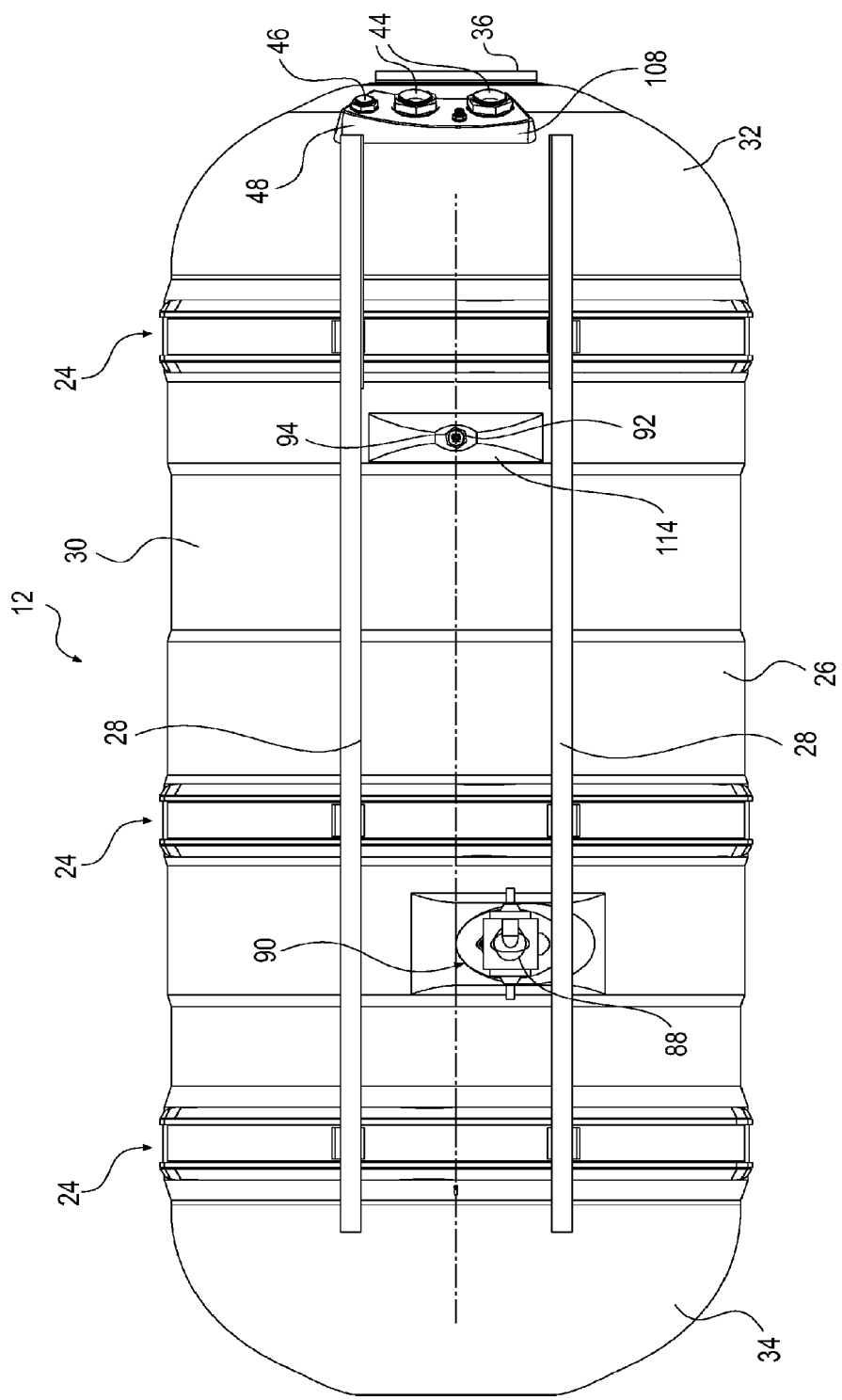
FIG. 4 is a bottom plan view of the transport tank of FIG. 2.
Figure 5:
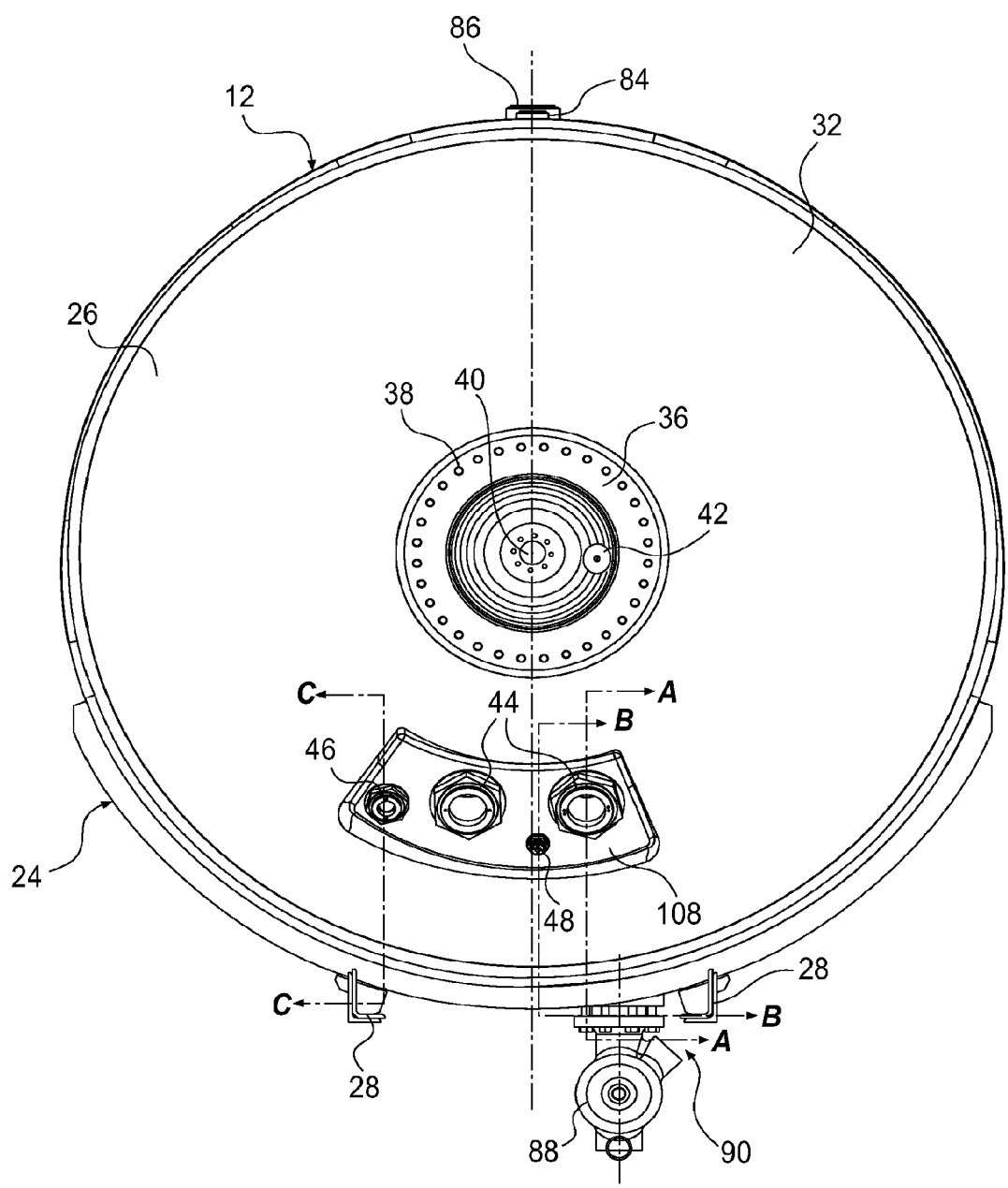
FIG. 5 is a rear elevation view of the transport tank of FIG. 2.

Turning now to FIGS. 2 to 5, the tank 12 will be described in more detail. The tank body 26 has a cylindrical central section 30 closed by two generally curved ends 32, 34. It is contemplated that the tank body 26 could be shaped so as to have a non-circular lateral cross-section, such as an ellipsoidal lateral cross-section. A man-way is formed in the rear end 32 of the tank body 26 to permit the passage of a person inside the tank 12 for maintenance, cleaning, and assembly of components of the tank 12. The man-way is closed by a cover 36 which is fastened by a plurality of threaded fasteners 38. As best seen in FIG. 5, a float gauge 40 is inserted in an aperture in the center of the cover 36. The float gauge 40 provides an indication of the level of liquid in the tank 12. A temperature gauge 42 is inserted in another aperture in the cover 36. The temperature gauge 42 provides an indication of the temperature of the liquid in the tank 12.

A number of fittings 44, 46 and 48 are provided in the rear end 32 of the tank body 26 below the man-way 36. The fittings 44, 46 and 48 are made of carbon steel. However, it is contemplated that the fittings 44, 46 and 48 could be made of other types of metal or of plastic, such as fiber reinforced plastic.

Figure 8:
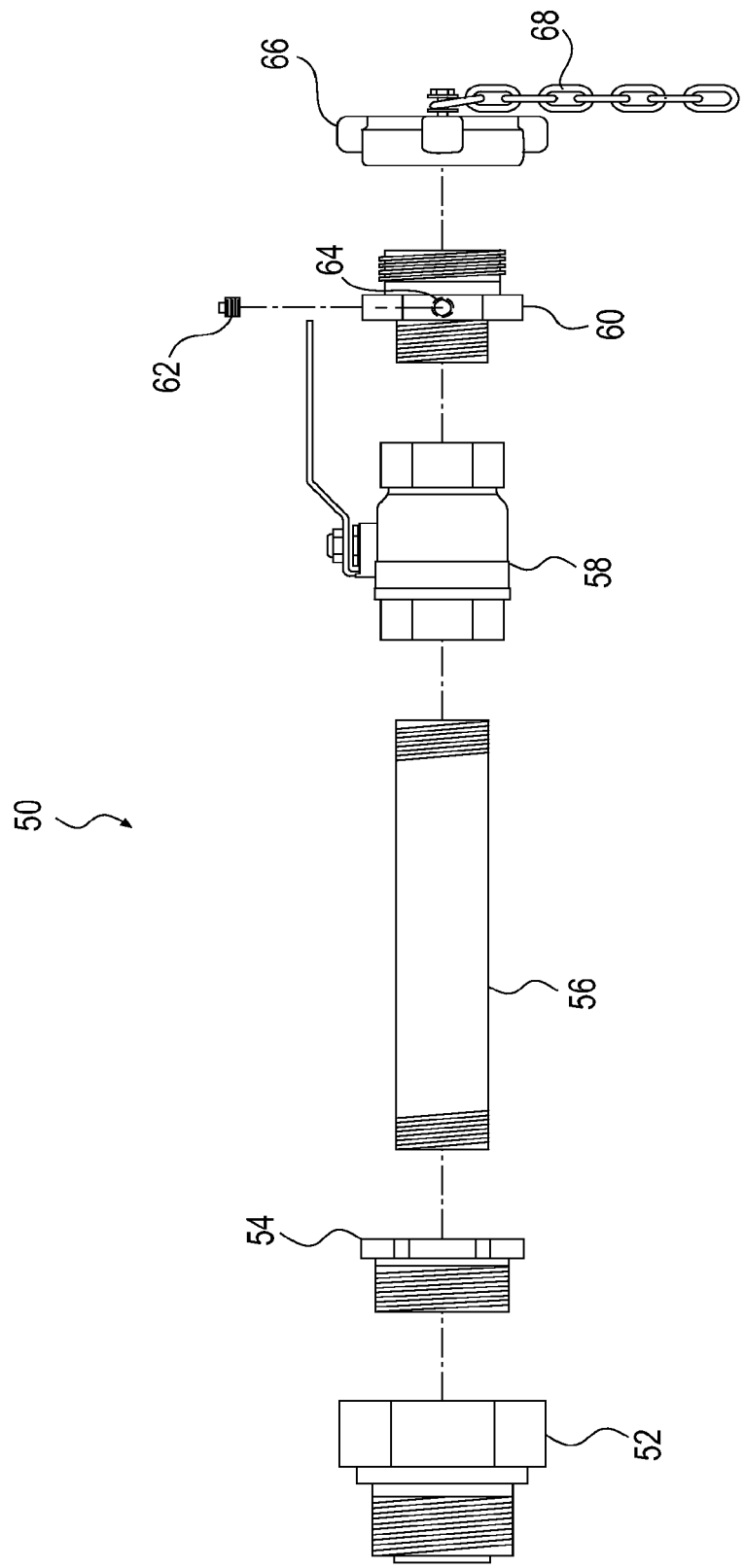
FIG. 8 is an exploded view of a pipe and valve assembly for attachment to a spray fill fitting of the transport tank of FIG. 2.

The two fittings 44 are referred to as spray fill fittings 44. The spray fill fittings 44 have a 3 inch NPS internal threaded connection (80 mm DN). It is contemplated that the fittings 44 could have a different NPS. A pipe and valve assembly 50, shown in FIG. 8, is connected to the outer end of the fittings 44. As shown in FIG. 8, the assembly 50 has a back pressure check valve 52. The valve 52 is threaded into the spray fill fitting 44 and prevents vapor from flowing out of the tank 12. A bushing 54 is threaded into the valve 52. A pipe 56 has one end threaded in the bushing 54 and another end threaded in an end of a manually operated valve 58. An adaptor 60 is threaded in the other end of valve 58. A plug 62 fits into a hole 64 in the side of the adaptor 60. The hole 64 gives an operator of the truck 10 the ability to install a vent valve and release pressure between the valve 58 and a removable cap 66 before connecting a fill hose. The removable cap 66 is threaded on the end of the adaptor 60. The cap 66 is connected to the tank 12 or truck 10 by a chain 68 to prevent the cap 66 from being misplaced when it is removed from the end of the adaptor 60. In the interior of the tank 12, pipes (not shown) are connected, by welding for example, to the spray fill fittings 44. The pipes are suspended from the top of the tank body 26, as described in greater detail below, such that the outlets of the pipes are higher than the fittings 44. To fill the tank 12, the cap 66 is removed from the adaptor 60. A fill hose from a storage tank holding the liquid to be put in the tank 12 is connected to the adaptor 60. The valve 58 is then opened and a pump turned on to pump liquid through the assembly 50 into the pipe and is finally sprayed inside the tank 12 (hence the name spray fill fitting for the fitting 44). Once the desired amount of liquid is in the tank 12, the pump is turned off, the valve 58 is closed and the cap 66 is threaded back on the adaptor 60. The above is simply a general description of the major steps necessary to fill the tank 12. It should be understood that additional steps could be necessary. By providing two spray fill fittings 44, it is possible to fill the tank 12 faster.

Figure 9:
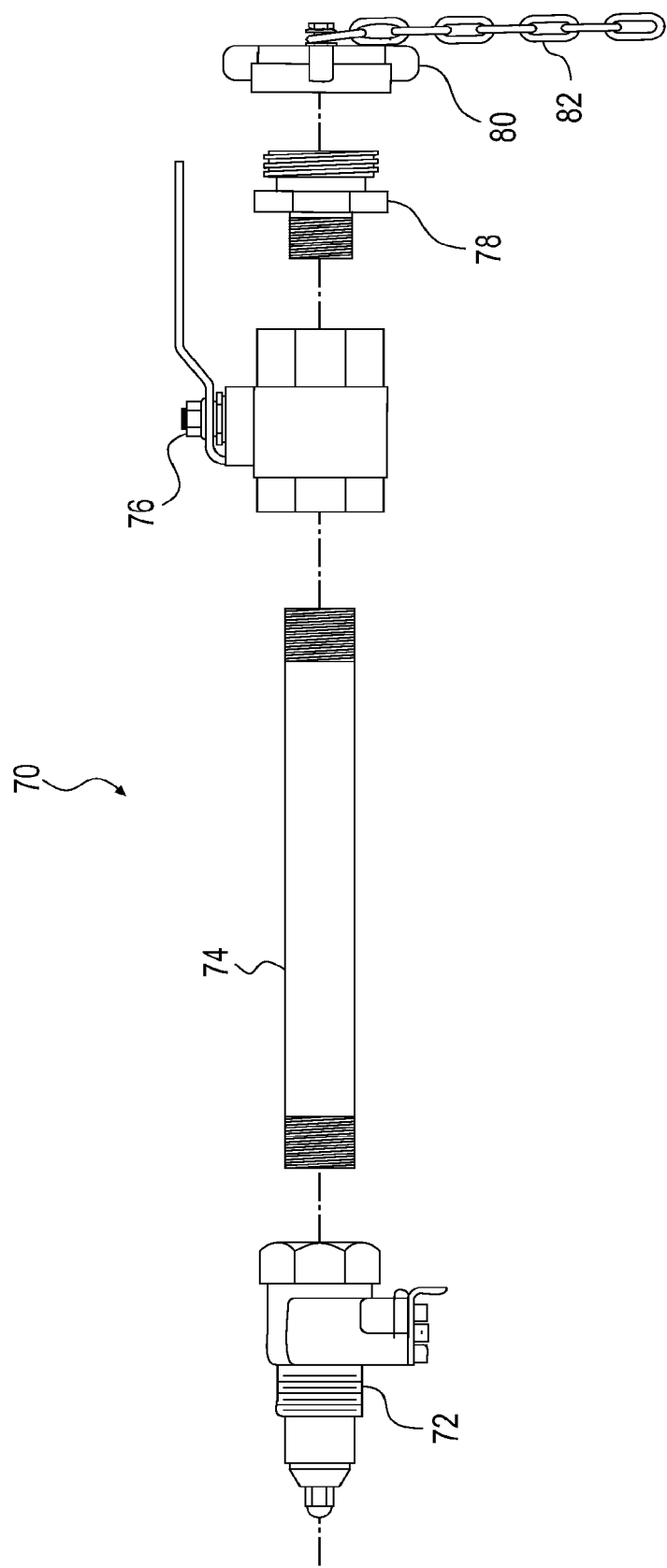
FIG. 9 is an exploded view of a pipe and valve assembly for attachment to a vapor fitting of the transport tank of FIG. 2.

The fitting 46 is referred to as a vapor fitting 46. The vapor fitting 46 has a 1¼ inch NPS internal threaded connection (32 mm DN). It is contemplated that the fitting 46 could have a different NPS. A pipe and valve assembly 70, shown in FIG. 9, is connected to the outer end of the fittings 46. As shown in FIG. 9, the assembly 70 has a valve 72. The valve 72 is threaded into the vapor fitting 46 and prevents vapor from accidentally releasing from the tank 12. A pipe 74 has one end threaded in the valve 72 and another end threaded in an end of a manually operated valve 76. An adaptor 78 is threaded in the other end of valve 76. A removable cap 80 is threaded on the end of the adaptor 78. The cap 80 is connected to the tank 12 or truck 10 by a chain 82 to prevent the cap 80 from being misplaced when it is removed from the end of the adaptor 78. In the interior of the tank 12, a pipe (not shown) is connected, by welding for example, to the vapor fitting 46. By removing the cap 80 from the adaptor 78 and by opening the valve 76, the operator can release vapor pressure from inside the tank 12.

The fitting 48 receives a pressure gauge (not shown) connected to a tube (not shown) disposed inside the tank 12 and a manual valve (not shown). The fitting 48 has a ¼ inch NPS internal threaded connection (8 mm DN). It is contemplated that the fitting 48 could have a different NPS. The tube has an opened end disposed inside the tank 12 at a level corresponding to 85% of the volume of tank body 26. When the level of liquid inside the tank body 26 reaches the end of the tube, the tank body 26 is 85% full. The operator can see that this volume is reached by opening the manual valve and determining if liquid is present in the valve. It is contemplated that this level may vary depending on local regulations.

The fittings 44, 46, and 48 will be described in greater detail further below with respect to FIGS. 10 to 16 and 18 to 20.

A number of fittings 84 and 86 are provided in the top of the tank body 26 along the longitudinal centerline of the tank 12. It is contemplated that the fittings 84 and 86 could be offset from the centerline of the tank 12. The fittings 84 and 86 are made of carbon steel. However, it is contemplated that the fittings 84 and 86 could be made of other types of metal or of plastic, such as fiber reinforced plastic.

The two fittings 84 each hold a hanger (not shown) which extends inside the tank body 86. The fittings 84 have a 1¾ inch (44.5 mm) external diameter and a threaded bore having a ¾ inch (19.1 mm) internal diameter. The outer surfaces and the apertures of the fittings 84 are threaded. It is contemplated that the fittings 84 could have different dimensions. The hangers hold the various pipes and tubes described above inside the tank body 26.

The fitting 86 receives a pressure relief valve (not shown). The pressure relief valve opens when a predetermined pressure is reached inside the tank body 26 thus preventing the tank body 26 from becoming over pressurized. The fitting 86 has a 3 inch NPS internal threaded connection (80 mm DN). It is contemplated that the fitting 86 could have a different NPS.

The fittings 84 and 86 will be described in greater detail further below with respect to FIGS. 18 and 21 to 23.

As seen in FIGS. 3 to 5, a pump 88 is mounted to a bottom of the tank body 26. The pump 88 is used to pump liquid out of the tank 12. The pump 88 is laterally offset from the longitudinal centerline of the tank 12 in order to facilitate operation of the pump 88 and so as not to interfere with other components of the truck 10 such as the frame 14. However, it is contemplated that the pump 88 could be mounted along the longitudinal centerline or at any other position on the tank body 26 depending on the structure of the truck 10 on which the tank 12 is mounted. The pump 88 is mounted to the tank body 26 via a pump mounting assembly 90. The pump mounting assembly 90 will be described in greater detail further below with respect to FIGS. 24 to 29.

Since the pump 88 is offset from the longitudinal centerline of the tank 12, the inlet to the pump 88 provided in the pump mounting assembly 90 is located higher than the lowest portion of the tank body 26. As such, the pump 88 cannot pump all of the liquid out of the tank body 26. To allow removal of all of the liquid from the tank body 26, a drain fitting 92 (FIG. 4) is provided in the bottom of the tank body 26 along the longitudinal centerline of the tank 12. The drain fitting 92 is made of carbon steel. However, it is contemplated that the drain fitting 92 could be made of other types of metal or of plastic, such as fiber reinforced plastic. The drain fitting 92 has a 1¼ inch NPS internal threaded connection (32 mm DN). It is contemplated that the drain fitting 92 could have a different NPS. The drain fitting 92 is closed by a threaded plug 94 (FIG. 4). By removing the threaded plug 94, the content of the tank body 26 can be drained by the drain fitting 92.

Although not shown, a baffle system is provided inside the tank body 26. The baffle system helps reduce sloshing of the liquid inside the tank body 26 during acceleration and deceleration of the truck 10.

Figure 14:
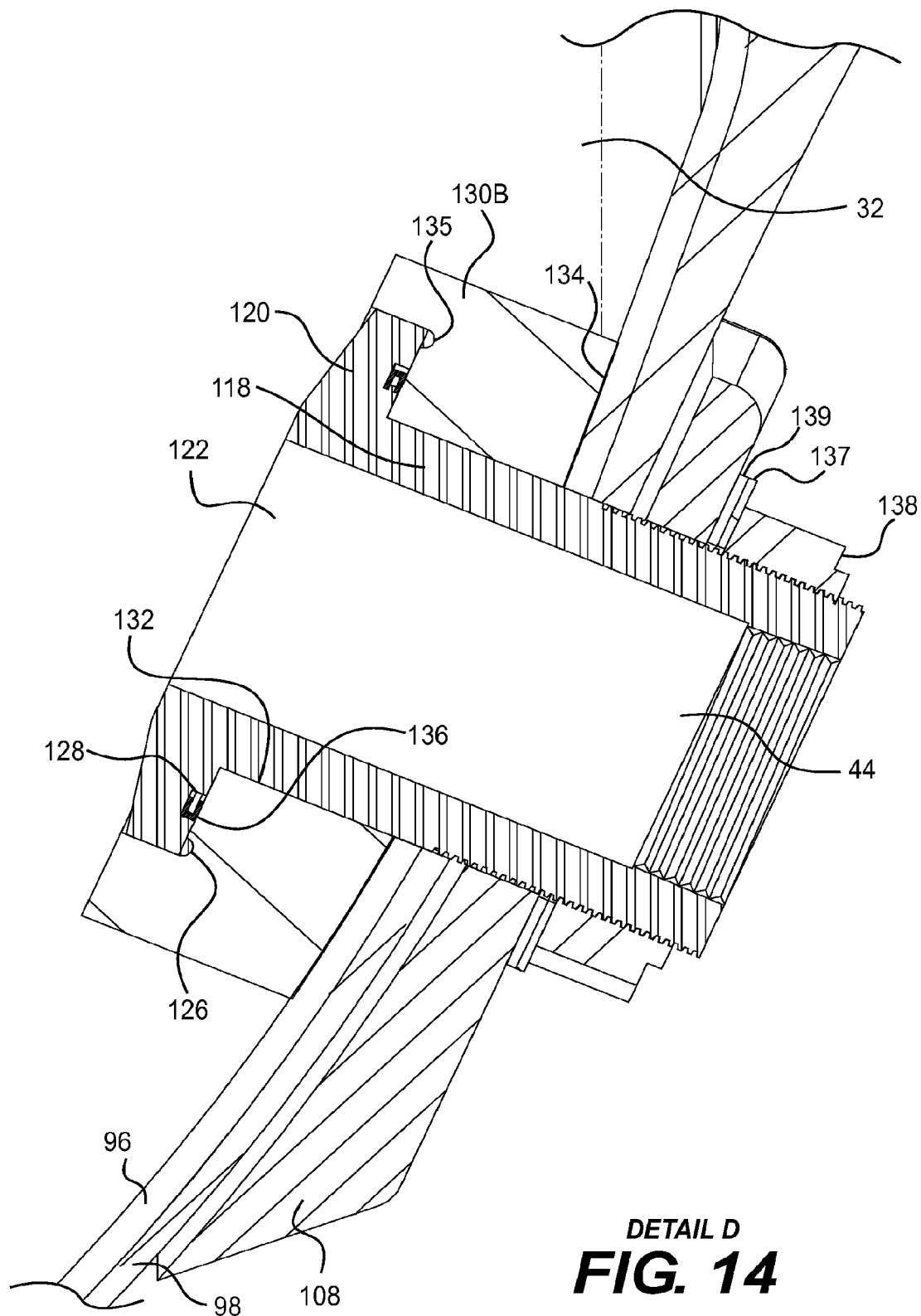
FIG. 14 is a close-up view of the section identified by line D in FIG. 11.

Turning now to FIGS. 6, 7 and 14, the structure and construction of the tank 12 will be described in more detail. As seen in FIG. 14, the tank body 26 is made of a liner 96 disposed inside a composite outer shell 98, thus forming a composite tank body 26.

As shown in FIG. 7, the liner 96 has a cylindrical central section 100 and two generally curved ends 102, 104. The liner 96 is made of high density polyethylene (HDPE) and is formed by a rotational molding process. The liner 96 is non-permeable. It is contemplated that the liner 96 could be made of another type of polymer. It is also contemplated that the liner 96 could be made of metal or other material. It is also contemplated that the liner 96 could be made by another type of process, such as blow-molding. It is also contemplated that the liner 96 could be permeable. A man-way fitting 106 (a portion of which is shown in FIG. 11) is bonded around an aperture in the end of the generally curved end 102 of the liner 96. In the finished tank 12, the man-way cover 36 is bolted onto the man-way fitting 106.

The outer shell 98 is then formed by winding carbon fibers impregnated with epoxy resin around the liner 96. The carbon fibers are wound helically (i.e. at an acute angle to the longitudinal central axis of the liner 96) and circumferentially (i.e. generally perpendicularly to the longitudinal central axis of the liner 96) around the liner 96 so as to cover the liner 96. The angles at which the carbon fiber helical and circumferential windings are applied and the number of layers to be applied depend on the size of the tank body 26, the amount of internal pressure that the tank body 26 needs to withstand, and the specific material characteristics of the carbon fiber and resin being used. It is contemplated that other types of composite materials could be used, such as aramid fibers impregnated with resin. It is contemplated that the fibers could be wound dry and that resin could be applied to the fibers as they are being wound or after a certain number of windings have been wound around the liner 96. Some of the windings cover portions of the man-way fitting 106 and hold it in place.

To install the fittings 44, 46, 48, 84, 86, and 92, apertures are cut into the tank body 26. However, as previously discussed, this creates a stress concentration in the area surrounding each aperture. Therefore, to compensate for the stress created by the apertures, a number of outer bosses 108, 110, 112 and 114 are mounted on the outer side of the tank body 26 prior to cutting the apertures in the areas where the apertures will be located. The outer bosses 108, 110, 112 and 114 are made of layers of composite material which are cut and set in molds corresponding to the shapes of the outer bosses 108, 110, 112 and 114. The molds with the layers of composite material are then cured. The outer bosses 108, 110, 112 and 114 are then bonded to the outer surface of the tank body 26. The inner sides of the outer bosses 108, 110, 112 and 114 are curved so as to follow the curvature of the portions of outer side of the tank body 26 to which they are bonded. The outer bosses 108, 110, 112 and 114 are shaped such that at least the portions of their outer sides that will surround the apertures are generally flat (see FIGS. 14 to 16, 21 and 22), for reasons discussed below. The number of layers and the angles at which the fibers are laid for each outer boss 108, 110, 112 and 114 depend on the dimension of the aperture and the strength characteristics of the tank body 26 in the area where the aperture is made. It is contemplated that the outer bosses 108, 110, 112 and 114 could also be formed by polymeric, metallic, or composite cores covered by carbon fibers and resin or other composite material. The cores would have inner sides that are complementary in shape to the portions of the outer side of the tank body 26 where the apertures will be cut. It is also contemplated that the outer bosses 108, 110, 112 and 114 could be formed by laying additional layers of carbon fibers impregnated with epoxy resins to the areas where the apertures will be located. It is also contemplated that the outer bosses 108, 110, 112 and 114 could also be formed by interspersing layers of carbon fiber and resin between windings forming the outer shell 98 of the tank body 26.

Figure 10:
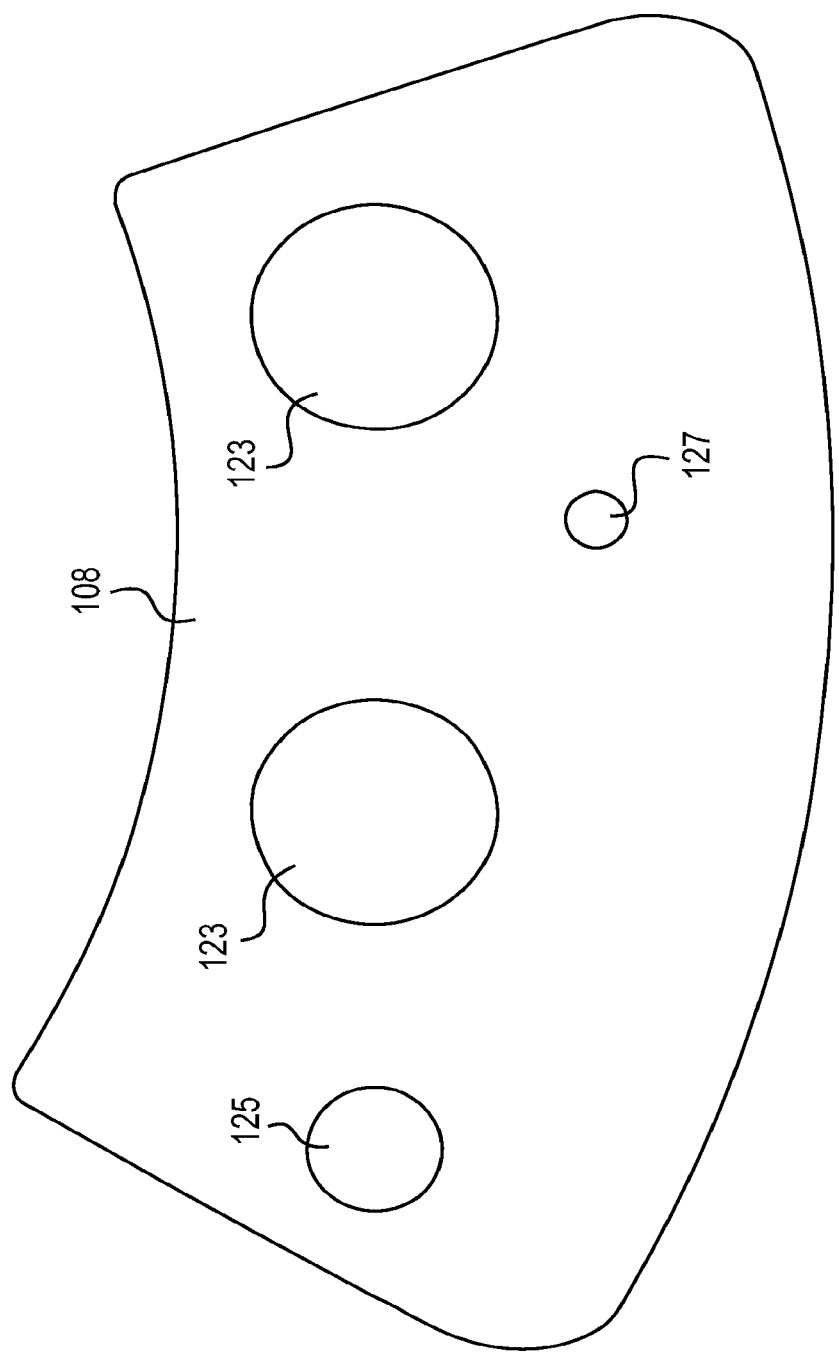
FIG. 10 is a rear elevation view of an outer boss located at a rear end of the transport tank of FIG. 2 with apertures cut therethrough.

Due to the relative proximity of the apertures for the fittings 44, 46 and 48, these apertures are provided with a common outer boss 108 shown in FIG. 10. However, it is contemplated that individual outer bosses could be provided for each one of the fittings 44, 46 and 48. The apertures for the fittings 84, 86 and 92 are each provided with their own outer boss 110, 112 and 114, respectively.

It is contemplated that the aperture provided for the pump mounting assembly 90 could also be provided with an outer boss similar to outer bosses 108, 110, 112 and 114.

Once the outer bosses 108, 110, 112, and 114 have been bonded to the tank body 26, the apertures for the fittings 44, 46, 48, 84, 86, and 92 are cut through the outer bosses 108, 110, 112, and 114, the outer shell 98 and the liner 96. The apertures for the pump mounting assembly 90 are also cut.

Once the apertures for the fittings 44, 46, 48, 84, 86, and 92 and for the pump mounting assembly 90 are cut, the fittings 44, 46, 48, 84, 86, and 92 and the pump mounting assembly 90 are mounted to the tank body 26 as described below.

Turning now to FIGS. 10 to 20 the fittings 44, 46 and 48 and their assembly to the tank body 26 will be described in more detail.

Figure 18:
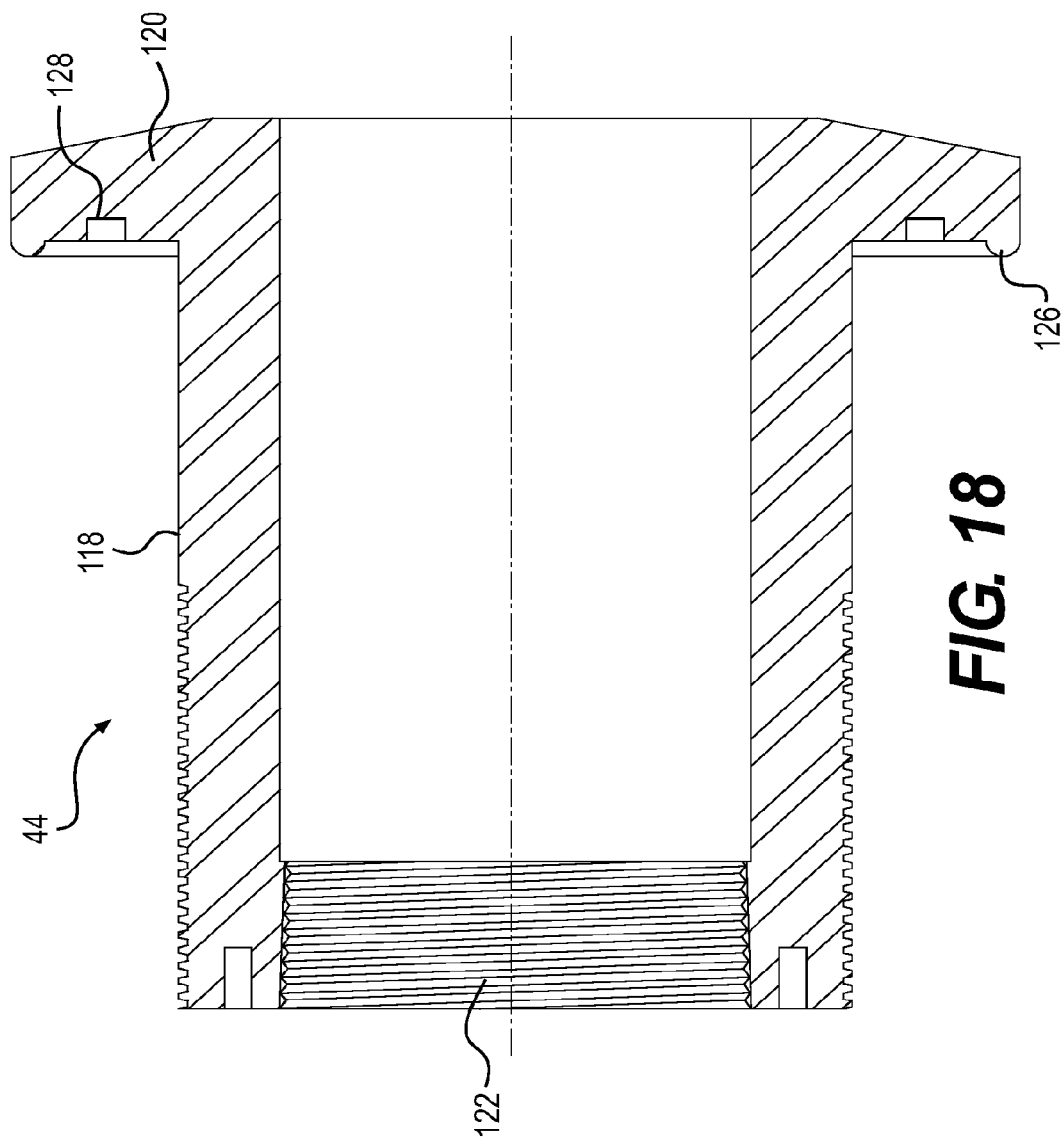
FIG. 18 is a cross-sectional view of a first fitting of the transport tank of FIG. 2.

As seen in FIG. 18, each spray fill fitting 44 has a tubular fitting body 118 having a flange 120 at one end thereof. The tubular body 118 and the flange 120 define a central aperture 122. The flange 120 is integrally formed with the tubular body 118, but it is contemplated that the flange 120 could be connected to the tubular body 118 otherwise, such as by welding. As can be seen, the diameter of the flange 120 is greater than the diameter of the tubular body 118. The diameter of the apertures cut into the outer boss 108 (aperture 123 in FIG. 10) and the tank body 26 to receive the fitting 44 corresponds to the diameter of the tubular body 118. The end of the tubular body 118 opposite the end where the flange 120 is located is threaded and sized to permit the fastening of the valve 52 therein. The outer surface of the tubular body 118 opposite the end where the flange 120 is located is threaded. The flange 120 has an annular lip 126 disposed adjacent the outer perimeter of the flange 120 on the face of the flange 120 which faces the inner side of the tank body 26 when the fitting 44 is installed in the tank body 26. It is contemplated that the annular lip 126 could be omitted. An annular groove 128 is also formed on the same face of the flange 120 as the annular lip 126. The annular groove 128 is disposed radially between the outer surface of the tubular body 118 and the annular lip 126.

Figure 19:
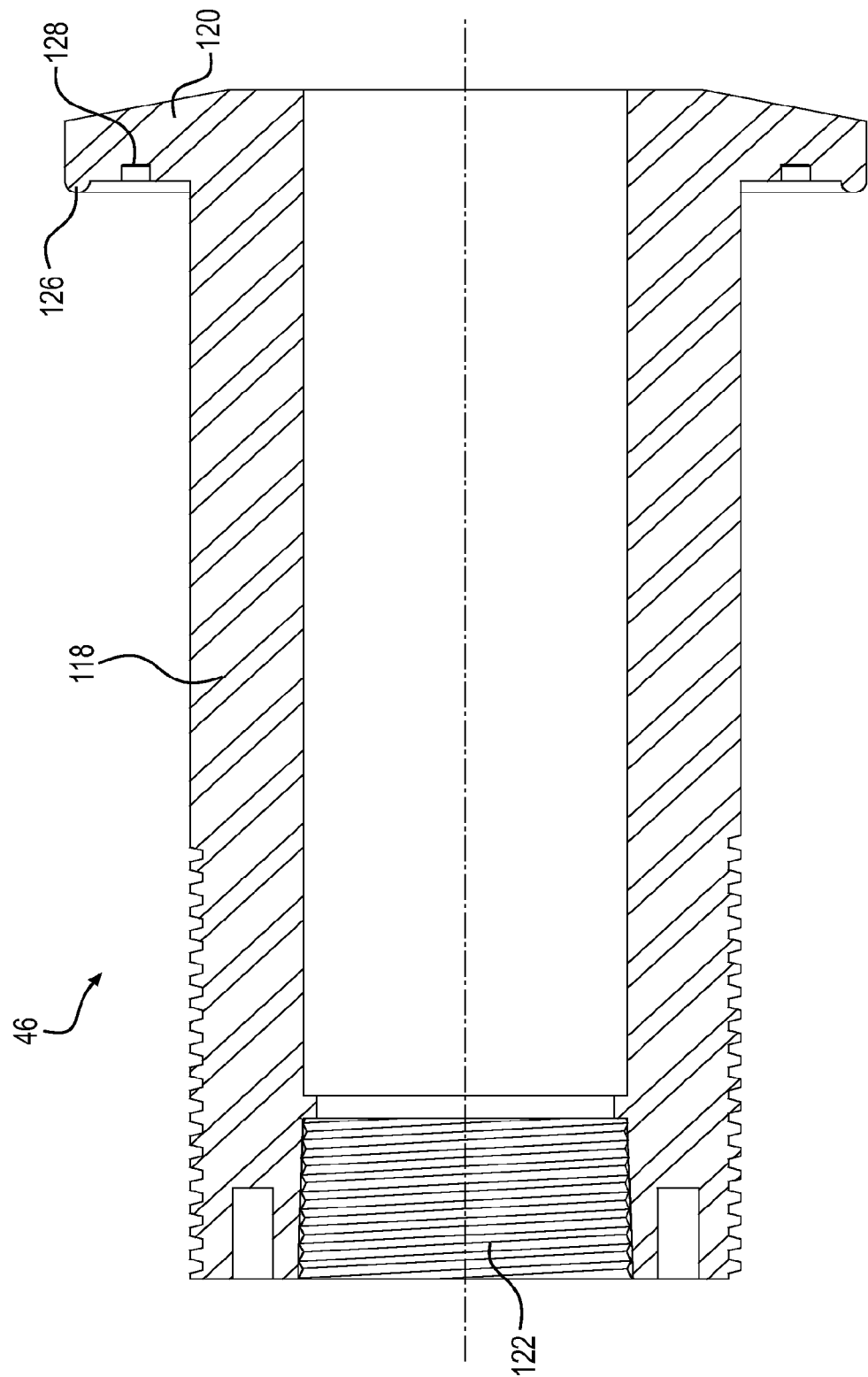
FIG. 19 is a cross-sectional view of a second fitting of the transport tank of FIG. 2.

The vapor fitting 46, shown in FIG. 19, has the same elements as the spray fill fittings 44, except that their dimensions are different. For simplicity, elements of the vapor fitting 46 which correspond to the elements of the spray fill fitting 44 have been labeled with the same reference numerals and will not be described again in detail. The diameter of the apertures cut into the outer boss 108 (aperture 125 in FIG. 10) and the tank body 26 to receive the fitting 46 corresponds to the diameter of the tubular body 118 of the fitting 46. The end of the tubular body 118 opposite the end where the flange 120 is located is threaded and sized to permit the fastening of the valve 72 therein.

Figure 20:
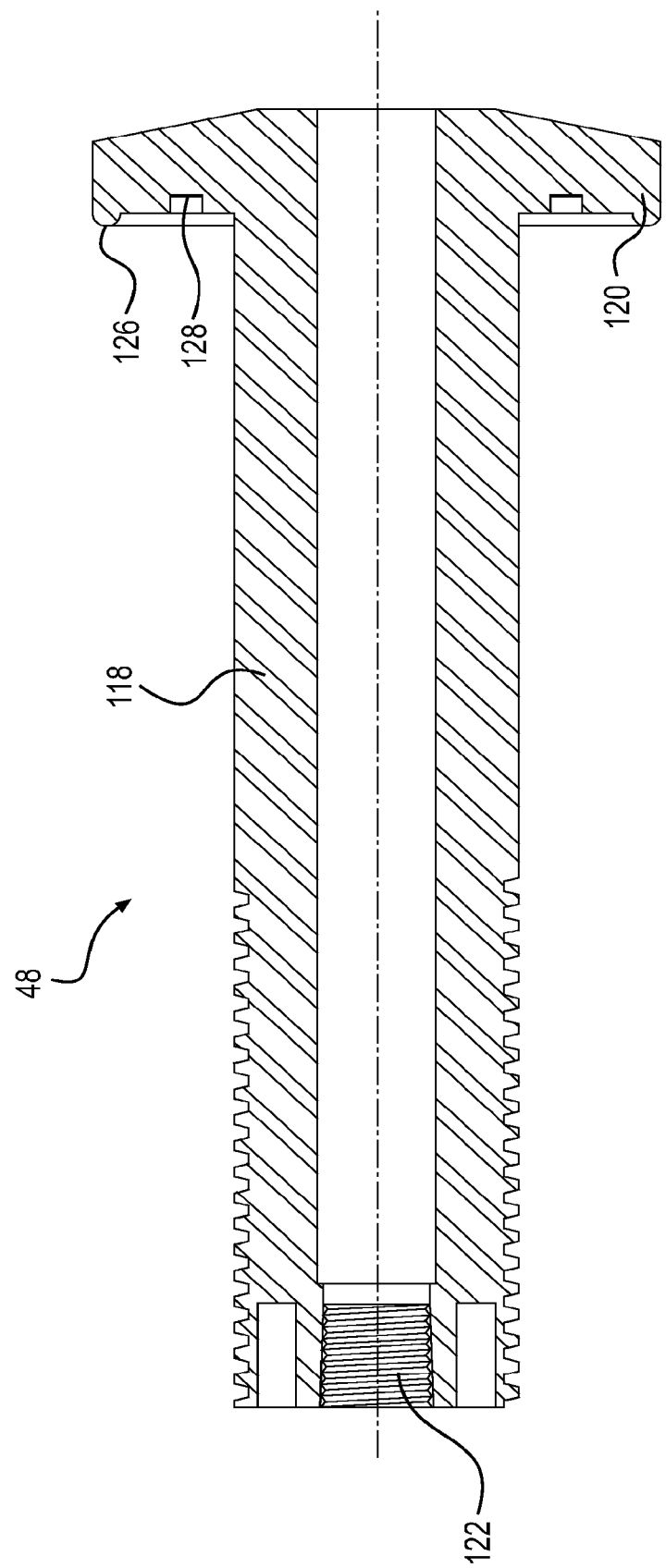
FIG. 20 is a cross-sectional view of a third fitting of the transport tank of FIG. 2.

The fitting 48, shown in FIG. 20, has the same elements as the spray fill fitting 44, except that their dimensions are different. For simplicity, elements of the fitting 48 which correspond to the elements of the spray fill fitting 44 have been labeled with the same reference numerals and will not be described again in detail. The diameter of the apertures cut into the outer boss 108 (aperture 127 in FIG. 10) and the tank body 26 to receive the fitting 48 corresponds to the diameter of the tubular body 118 of the fitting 48. The end of the tubular body 118 opposite the end where the flange 120 is located is threaded.

Figure 15:
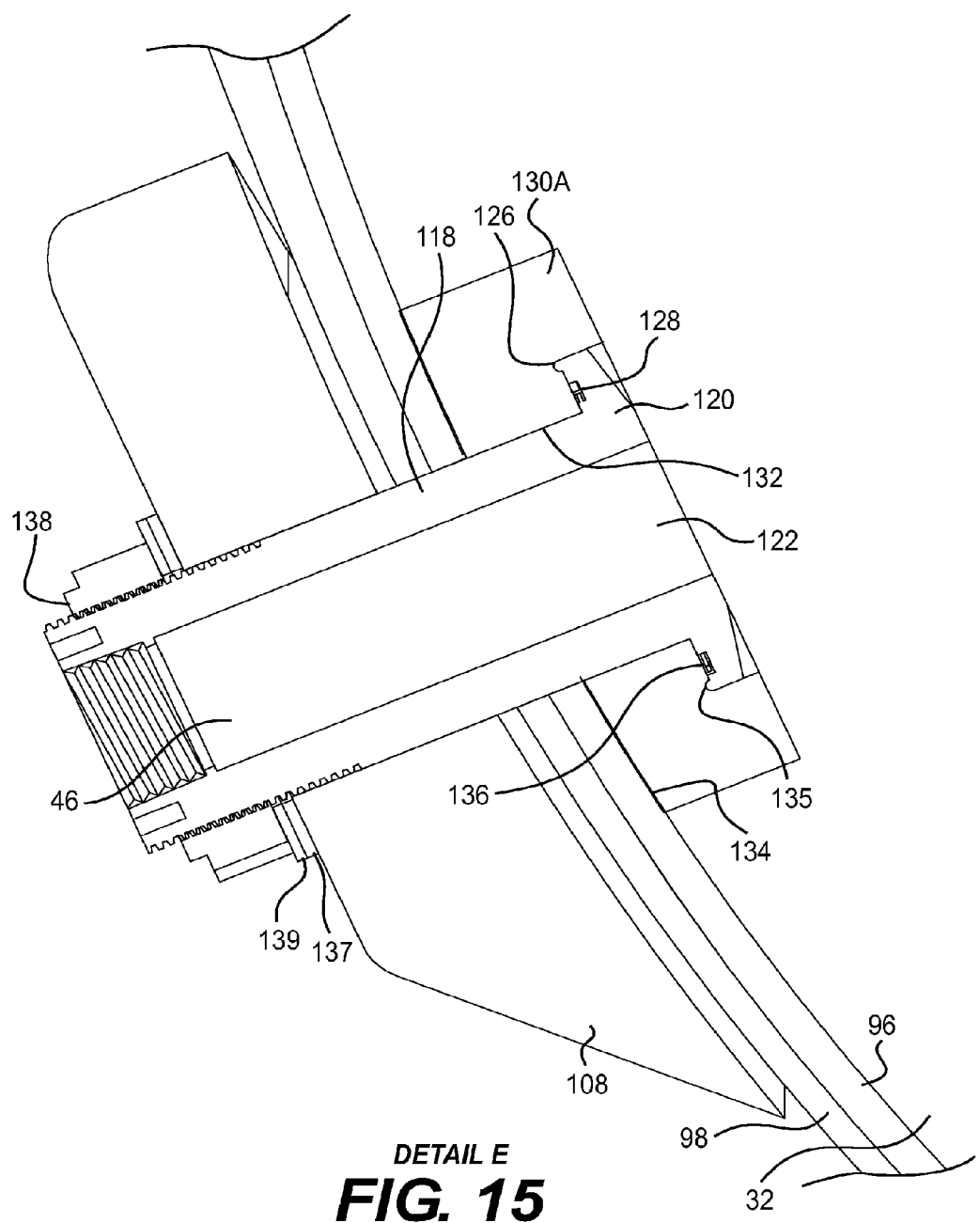
FIG. 15 is a close-up view of the section identified by line E in FIG. 12.
Figure 16:
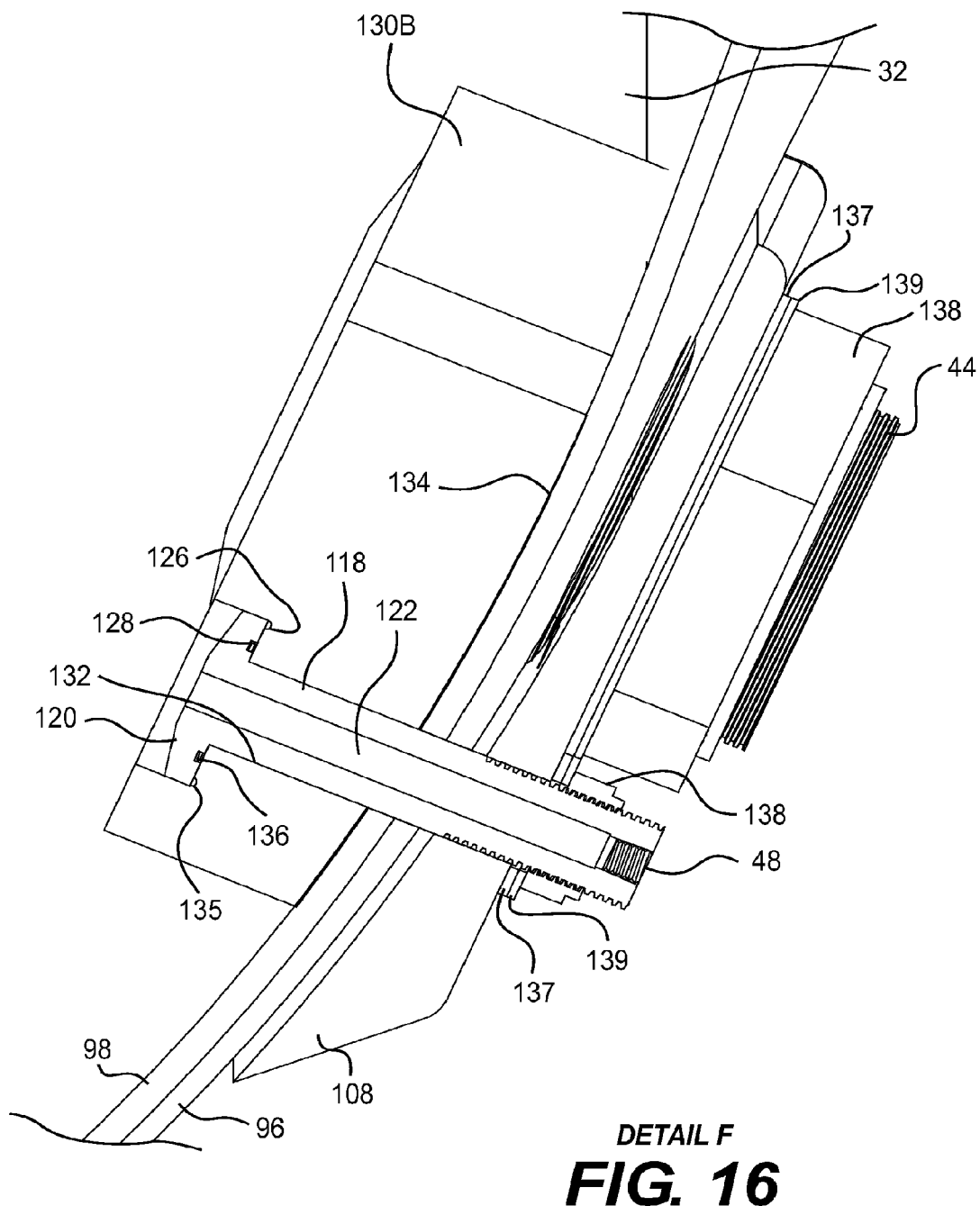
FIG. 16 is a close-up view of the section identified by line F in FIG. 13.
Figure 17:
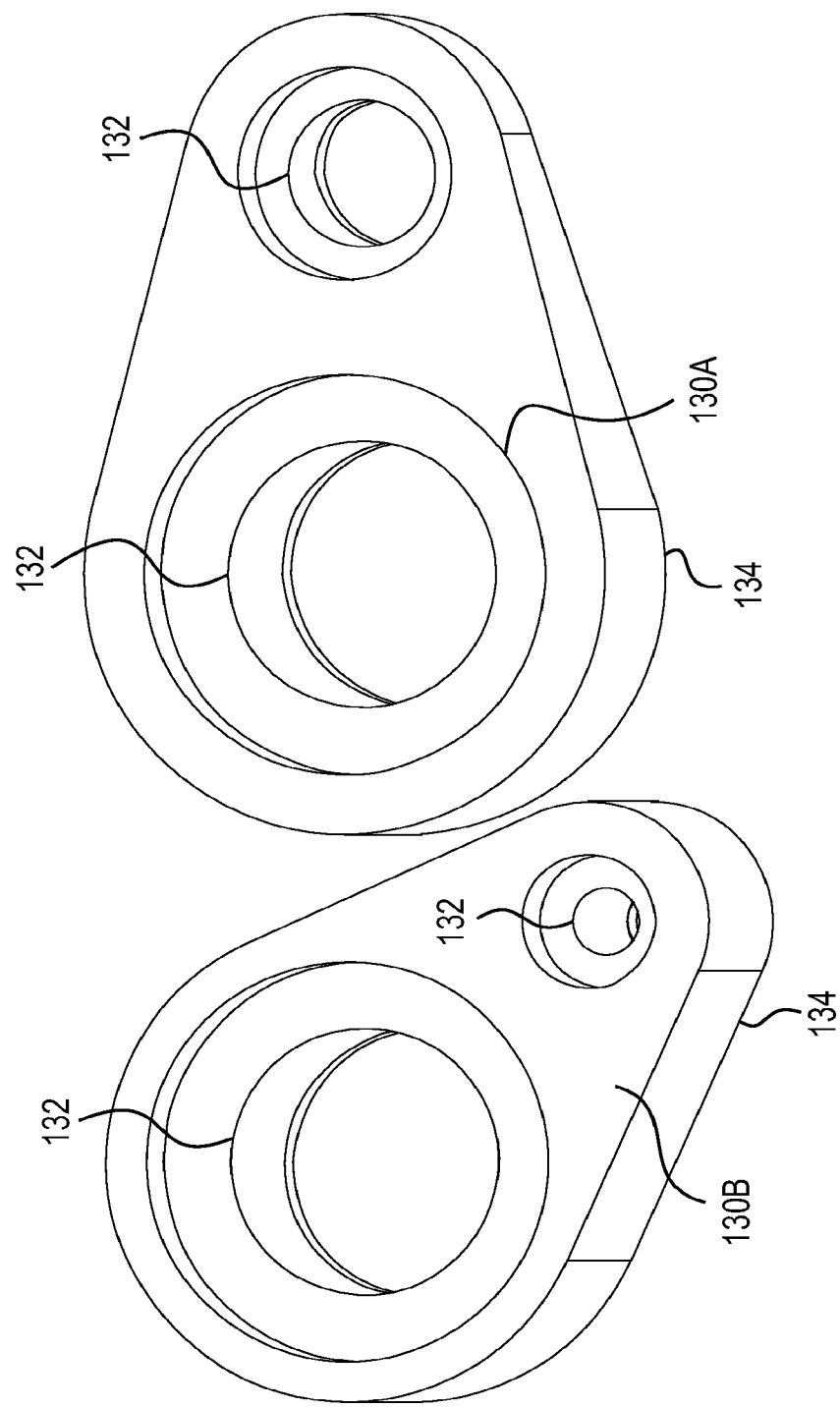
FIG. 17 is a front perspective view of rear inner bosses of the tank of FIG. 2.

As can be seen in FIGS. 11 to 16, when the fittings are mounted to the tank body 26, an inner boss 130A is disposed between the flanges 120 of one of the fittings 44 and of the fitting 46 and the inner side of the tank body 26 and another inner boss 130B is disposed between the flanges 120 of the other one of the fittings 44 and of the fitting 48 and the inner side of the tank body 26. The inner bosses 130A and 130B are made of HDPE. It is contemplated that a single inner boss common to all four fittings 44, 46 and 48 could be provided due to the relative proximity of the fittings 44, 46 and 48 once mounted to the tank body 26. It is contemplated that individual inner bosses could be provided for each one of the fittings 44, 46 and 48. As shown in FIG. 17, the inner bosses 130A and 130B have a plurality of apertures 132. The diameters of the apertures 132 correspond to the diameters of the tubular bodies 118 of the fittings 44, 46 and 48 to be inserted therein. The apertures 132 are located in the inner boss 130 so as to be aligned with the apertures cut in the outer boss 108 (i.e. apertures 123, 125, and 127) and the tank body 26 for receiving the tubular bodies 118 of the fittings 44, 46 and 48. A side 134 of each of the inner bosses 130A and 130B which abuts the liner 96 when they are mounted to the tank body 26 (i.e. the outer sides of the inner bosses 130A and 130B) is curved so has to be complementary in shape to the portion of the liner 96 which it abuts when mounted to the tank body 26. The opposite side of each of the inner bosses 130A and 130B (i.e. the inner sides of the inner bosses 130A and 130B) has a plurality of recesses formed therein around the apertures 132 to receive the flanges 120 of the fittings 44, 46 and 48. The recesses include annular grooves 135 (FIGS. 14 to 16) to receive the annular lips 126 of the fittings 44, 46 and 48.

Prior to inserting the fittings 44, 46 and 48 into their corresponding inner bosses 130A and 130B, the fittings 44, 46 and 48 are heated. Face seals 136 are then placed inside the annular grooves 128 of the fittings 44, 46 and 48 (see FIGS. 14 to 16). It is contemplated that the face seals 136 could be replaced by O-rings. Each of the fittings 44, 46 and 48 is then inserted in its corresponding aperture 132 of the inner bosses 130A and 130B. The heated fittings 44, 46 and 48 cause the portions of the inner bosses 130A and 130B adjacent to the fittings 44, 46 and 48 to melt and fuse with the fittings 44, 46 and 48. This ensures that the interfaces between the fittings 44, 46 and 48 and the inner bosses 130A and 130B are properly sealed. It is contemplated that, alternatively, the fittings 44, 46 and 48 could be bonded to the inner bosses 130A and 130B by an adhesive. The lips 126 of the fittings 44, 46 and 48 and the face seals 136, which are now retained between the flanges 120 and the inner bosses 130A and 130B, also help ensure that no fluid will escape from inside the tank body 26 via the interfaces between the fittings 44, 46 and 48 and the inner bosses 130A and 130B once the fittings 44, 46 and 48 are mounted to the tank body 26. As can be seen in FIGS. 14 to 16, the inner bosses 130A and 130B abut the circumference of the flanges 120 of the fittings 44, 46 and 48, thus increasing the length of the interfaces between the fittings 44, 46 and 48 and the inner bosses 130A and 130B.

The fittings 44, 46 and 48, which are mounted to the inner bosses 130A and 130B, are then inserted into their corresponding apertures in the tank body 26 and the outer boss 108. As can be seen in FIGS. 14 to 16, the threaded ends of the tubular bodies 118 of the fittings 44, 46 and 48 extend outside the tank body 26 beyond the outer boss 108. An elastomeric spring washer 137 and a steel washer 139 are placed around the threaded ends of the tubular bodies 118 of the fittings 44, 46 and 48 that extend outside the tank body 26 beyond the outer boss 108. It is contemplated that the elastomeric spring washers 137 could be replaced by one or more sheets of elastomeric material having apertures therein to receive the threaded ends of the tubular bodies 118 of the fittings 44, 46 and 28. A nut 138 is fastened onto the treaded end of each one of the tubular bodies 118. Once fastened, the nuts 138 abut the washers 139, which abut the spring washers 137, which abut the generally flat surfaces formed on the outer side of the outer boss 108. As such the generally flat surfaces help ensure a good contact between the washers 137, 139, the nuts 138 and the outer boss 108 which helps to maintain the fittings 44, 46 and 48 in position. By tightening the nuts 138 against the outer boss 108, the washers 137, 139, the outer boss 108, the tank body 26 and the inner bosses 130A and 130B are compressed between the nuts 138 and the flanges 120 of the fittings 44, 46 and 48. This creates seals between the outer surfaces 134 of the inner bosses 130A and 130B and the liner 96, thus preventing fluid inside the tank body 26 from escaping via the interfaces between the inner bosses 130A and 130B and the liner 96. It is contemplated that the inner bosses 130A and 130B could also be welded or fused to the liner 96.

Figure 21:
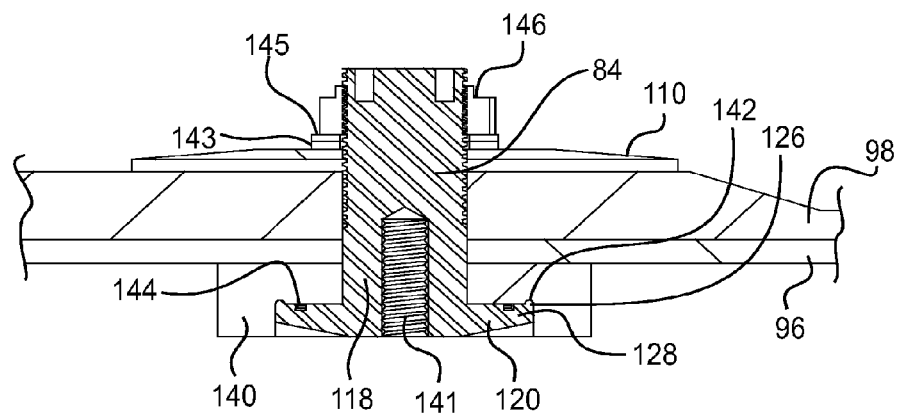
FIG. 21 is a cross-sectional view of the transport tank of FIG. 2 taken through line 21-21 of FIG. 2.
Figure 22:
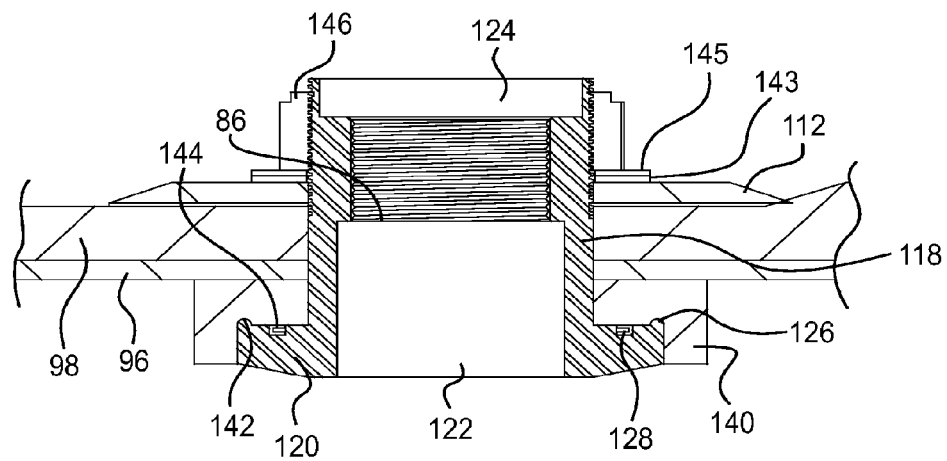
FIG. 22 is a cross-sectional view of the transport tank of FIG. 2 taken through line 22-22 of FIG. 2.
Figure 23:
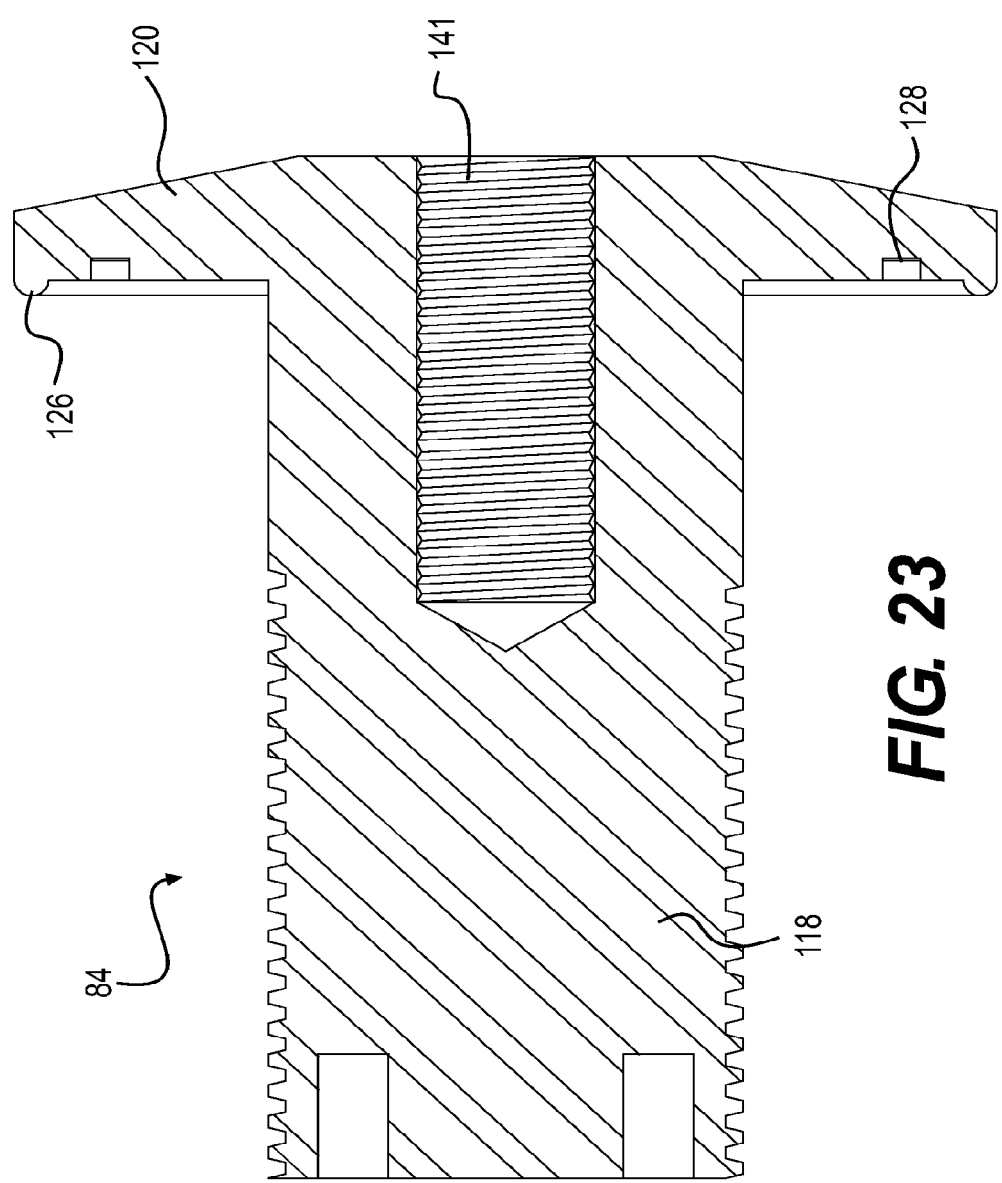
FIG. 23 is a cross-sectional view of a fourth fitting of the transport tank of FIG. 2.

Turning now to FIGS. 21 to 23 the fittings 84, 86 and 92 and their assembly to the tank body 26 will be described in more detail.

The fittings 84, one of which is shown in FIG. 23, have the same elements as the spray fill fitting 44, except that their dimensions are different and that it does not have an aperture 122 extending therethrough. Instead of the aperture 122, the fittings 84 each have a threaded bore 141 formed in the bottom of thereof. The threaded bores 141 are used to fasten the hangers (not shown) holding the pipes and tubes extending from the fittings 44, 46 and 48 inside the tank body 26. For simplicity, elements of the fitting 84 which correspond to the elements of the spray fill fitting 44 have been labeled with the same reference numerals and will not be described again in detail. The diameter of the apertures cut into the outer bosses 110 and the tank body 26 to receive the fittings 84 correspond to the diameter of the tubular bodies 118 of the fittings 84. It is contemplated that the fittings 84 could be solid (i.e. without the threaded bores). In such an embodiment the hanger would be welded to the fitting. It is also contemplated that the threaded bores 141 could be replaced by threaded apertures extending through the fittings 84.

The assembly of one of the fittings 84 to the tank body 26 will now be described with respect to FIG. 21. The assembly of the other fitting 84 to the tank body 26 is the same. As can be seen in FIG. 21, an inner boss 140 is disposed between the flange 120 of the fitting 84 and the inner side of the tank body 26 when the fitting is mounted to the tank body 26. The inner boss 140 is made of HDPE. The inner boss 140 has an aperture defined therein. The diameter of the aperture corresponds to the diameter of the tubular body 118 of the fitting 84. A side of the inner boss 140 which abuts the liner 96 when it is mounted to the tank body 26 (i.e. the outer side of the inner boss 140) is curved so has to be complementary in shape to the portion of the liner 96 which it abuts when mounted to the tank body 26. The opposite side of the inner boss 140 (i.e. the inner side of the inner boss 140) has a recess formed therein around the aperture to receive the flange 120 of the fitting 84. The recess includes an annular groove 142 to receive the annular lip 126 of the fitting 84.

Prior to inserting the fitting 84 into the inner boss 140, the fitting 84 is heated. An face seal 144 is then placed inside the annular groove 128 of the fitting 84. It is contemplated that the face seal 144 could be replaced by an O-ring. The fitting 84 is then inserted in the aperture of the inner boss 140. The heated fitting 84 causes the portion of the inner boss 140 adjacent to the fitting 84 to melt and fuse with the fitting 84. This ensures that the interface between the fitting 84 and the inner boss 140 is properly sealed. It is contemplated that, alternatively, the fitting 84 could be bonded to the inner boss 140 by an adhesive. The lip 126 of the fitting 84 and the face seal 144, which is now retained between the flange 120 and the inner boss 140, also help ensure that no fluid will escape from inside the tank body 26 via the interfaces between the fittings 84 and the inner boss 140 once the fitting 84 is mounted to the tank body 26. As can be seen in FIG. 21, the inner boss 140 abuts the circumference of the flange 120 of the fitting 84, thus increasing the length of the interface between the fitting 84 and the inner boss 140.

The fitting 84, which is mounted to the inner boss 140, is then inserted into its corresponding apertures in the tank body 26 and the outer boss 110. As can be seen in FIG. 21, the threaded end of the tubular body 118 of the fitting 84 extends outside the tank body 26 beyond the outer boss 118. An elastomeric spring washer 143 and a steel washer 145 are placed around the threaded end of the tubular body 118 of the fitting 84 that extends outside the tank body 26 beyond the outer boss 110. A nut 146 is fastened onto the treaded end of the tubular body 118. Once fastened, the nut 146 abuts the washer 145, which abuts the washer 143, which abuts the generally flat surface formed on the outer side of the outer boss 110. As such the generally flat surfaces help ensure a good contact between the washers 143, 145, the nut 146 and the outer boss 110 which helps to maintain the fitting 84 in position. By tightening the nuts 146 against the outer boss 110, the washers 143, 145, the outer boss 110, the tank body 26 and the inner boss 140 are compressed between the nut 146 and the flange 120 of the fitting 84. This creates a seal between the outer surface of the inner boss 140 and the liner 96, thus preventing fluid inside the tank body 26 from escaping via the interface between the inner boss 140 and the liner 96. It is contemplated that the inner boss 140 could also be welded or fused to the liner 96.

The fitting 86 has a structure similar to that of the spray fill fitting 44 shown in FIG. 18. For simplicity, elements of the fitting 86 which correspond to the elements of the spray fill fitting 44 have been labeled with the same reference numerals and will not be described again in detail. However, the aperture 122 of the fitting 86 has three sections having different diameters. The uppermost section defines a counterbore 124 (FIG. 22) to receive the pressure relief valve. Also, it is the central section of the central aperture 122 which is threaded to permit fastening of the pressure relief valve. The diameter of the apertures cut into the outer boss 112 and the tank body 26 to receive the fitting 86 corresponds to the diameter of the tubular body 118 of the fitting 86. As can be seen in FIG. 22, the fitting 86 is mounted to the tank body 26 using an inner boss and a nut in the same manner as the fittings 84 described above, and as such the assembly of the fitting 86 to the tank body 26 will not be described again in detail. For simplicity, the inner boss and nut for the fitting 86 have been labeled in FIG. 22 with the same reference numerals as those used for the fittings 84. As would be understood, the inner boss 140, the annular groove 142, the washers 143, 145, the face seal 144, and the nut 146 for the fitting 86 are dimensioned to fit the fitting 86.

The drain fitting 92 has the same structure and elements as the spray fill fittings 44, except that their dimensions are different. The drain fitting 92 will therefore not be described in detail. The diameter of the apertures cut into the outer boss 114 and the tank body 26 to receive the fitting 92 corresponds to the diameter of the tubular body 118 of the fitting 92. Although not shown, the fitting 92 is mounted to the tank body 26 using an inner boss, an elastomeric spring washer, a steel washer and a nut in the same manner as the fittings 84 described above, and as such the assembly of the fitting 92 to the tank body 26 will not be described in detail. As would be understood, the inner boss, the annular groove, the washers, the face seal, and the nut for the fitting 92 are dimensioned to fit the fitting 92.

Turning now to FIGS. 24 to 29, the pump mounting assembly 90 will be described in more detail. The pump mounting assembly 90 includes a flange 150, an inner boss 152, an outer boss 154 and a plurality of threaded fasteners 156. In the present embodiment, the threaded fasteners 156 are bolts, however it is contemplated that other types of threaded fasteners could be used. A plurality of apertures is cut in the tank body 26 to mount the pump mounting assembly 90.

As best seen in FIG. 26, the flange 150 has a central aperture 158 and a plurality of threaded apertures 160 disposed in a circle around the central aperture 158. The central aperture 158 and the plurality of threaded apertures 160 are arranged such that when the pump mounting assembly 90 is mounted to the tank body 26, each of the apertures 158, 160 is aligned with a corresponding one of the plurality of apertures in the tank body 26. The flange 150 has an annular lip 162 disposed adjacent the outer perimeter of the flange 150 on the face of the flange 150 which faces the inner side of the tank body 26 when the flange 150 is installed in the tank body 26. It is contemplated that the annular lip 162 could be omitted. An annular groove 164 (FIGS. 24, 25) is also formed on the same face of the flange 150 as the annular lip 162. The annular groove 128 is disposed radially between the central aperture 158 and the threaded apertures 160. The flange 150 is made of carbon steel. However, it is contemplated that the flange 150 could be made of other types of metal or of plastic, such as fiber reinforced plastic. It is also contemplated that a tubular body could be connected to the flange 150.

Figure 25:
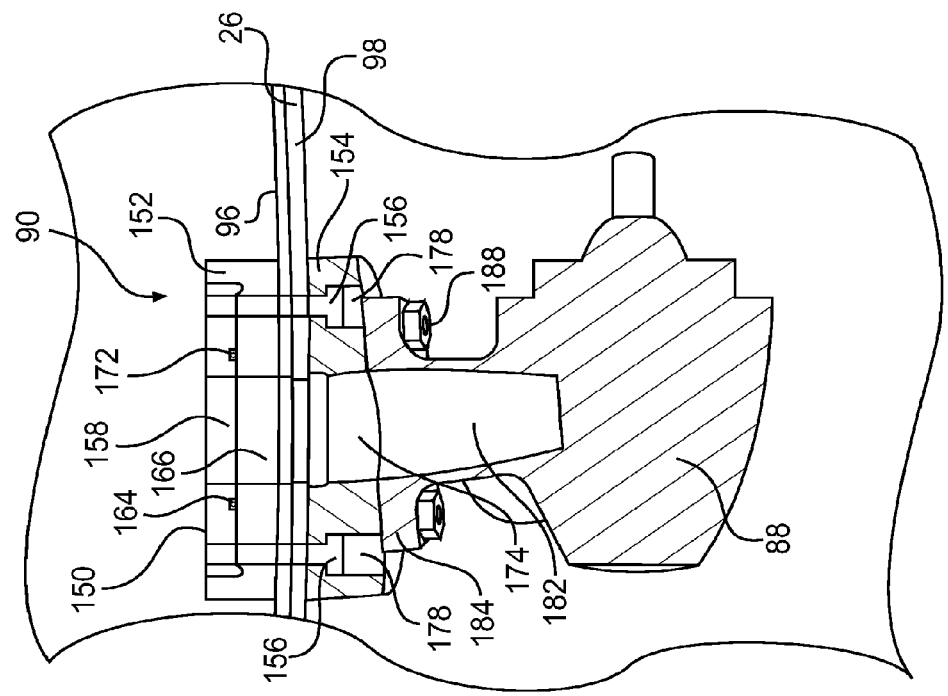
FIG. 25 is a longitudinal cross-section of the pump and pump mounting assembly of the transport tank of FIG. 2.
Figure 24:
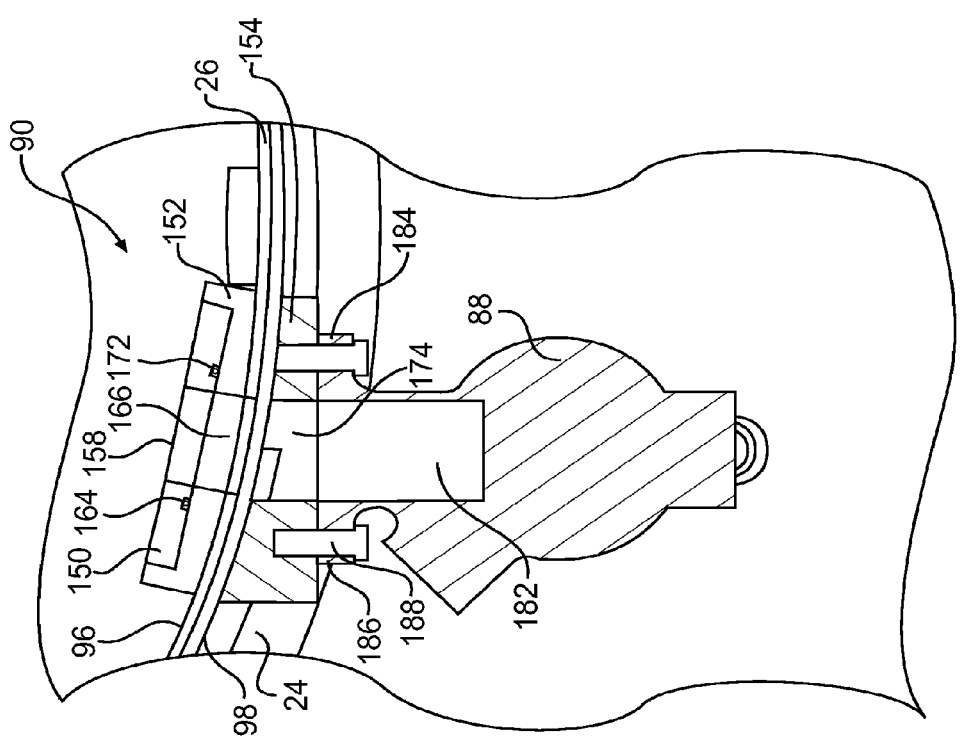
FIG. 24 is a lateral cross-section of a pump and pump mounting assembly of the transport tank of FIG. 2.
Figure 27:
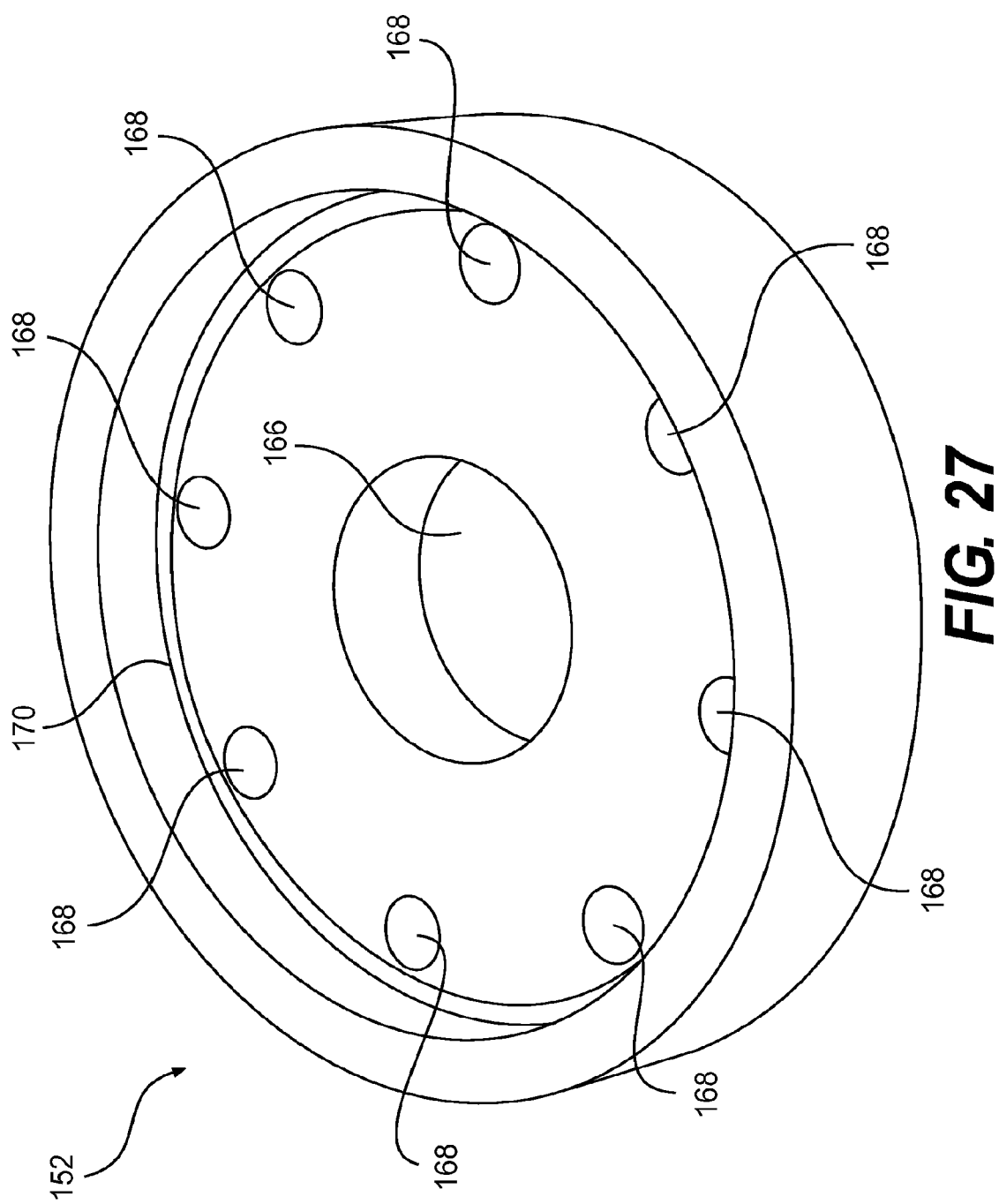
FIG. 27 is a perspective view of an inner boss of the pump mounting assembly of FIG. 24.

As best seen in FIG. 27, the inner boss 152 has a central aperture 166 and a plurality of apertures 168 disposed in a circle around the central aperture 166. A side of the inner boss 152 which abuts the liner 96 when it is mounted to the tank body 26 (i.e. the outer side of the inner boss 152) is curved so has to be complementary in shape to the portion of the liner 96 which it abuts when mounted to the tank body 26 as can be seen in FIGS. 24 and 25. As seen in FIG. 27, the opposite side of the inner boss 152 (i.e. the inner side of the inner boss 152) has a recess formed therein around the aperture 166 to receive the flanges 150. The recess includes an annular groove 170 to receive the annular lip 162 of the flange 150. The central aperture 166 and the plurality of apertures 168 are positioned so as to be aligned with the central aperture 158 and the plurality of apertures 160 respectively when the flange 150 is disposed in the recess of the inner boss 152. The inner boss 152 is made of HDPE.

Prior to inserting the flange 150 into the recess of the inner boss 152, the flange 150 is heated. An O-ring 172 is then placed inside the annular groove 170. The flange 150 is then inserted in the recess of the inner boss 152. The heated flange 150 causes the portion of the inner boss 152 adjacent to the flange 150 to melt and fuse with the flange 150. This ensures that the interface between the flange 150 and the inner boss 152 is properly sealed. It is contemplated that, alternatively, the flange 150 could be bonded to the inner boss 152 by an adhesive. The lip 162 of the flange 150 and the O-ring 172, which is now retained between the flange 150 and the inner boss 152, also help ensure that no fluid will escape from inside the tank body 26 via the interfaces between the flange 150 and the inner boss 152 once the pump mounting assembly 90 is mounted to the tank body 26. As can be seen in FIGS. 24 and 25, the inner boss 152 abuts the circumference of the flange 150, thus increasing the length of the interface between the flange 150 and the inner boss 152.

Figure 28:
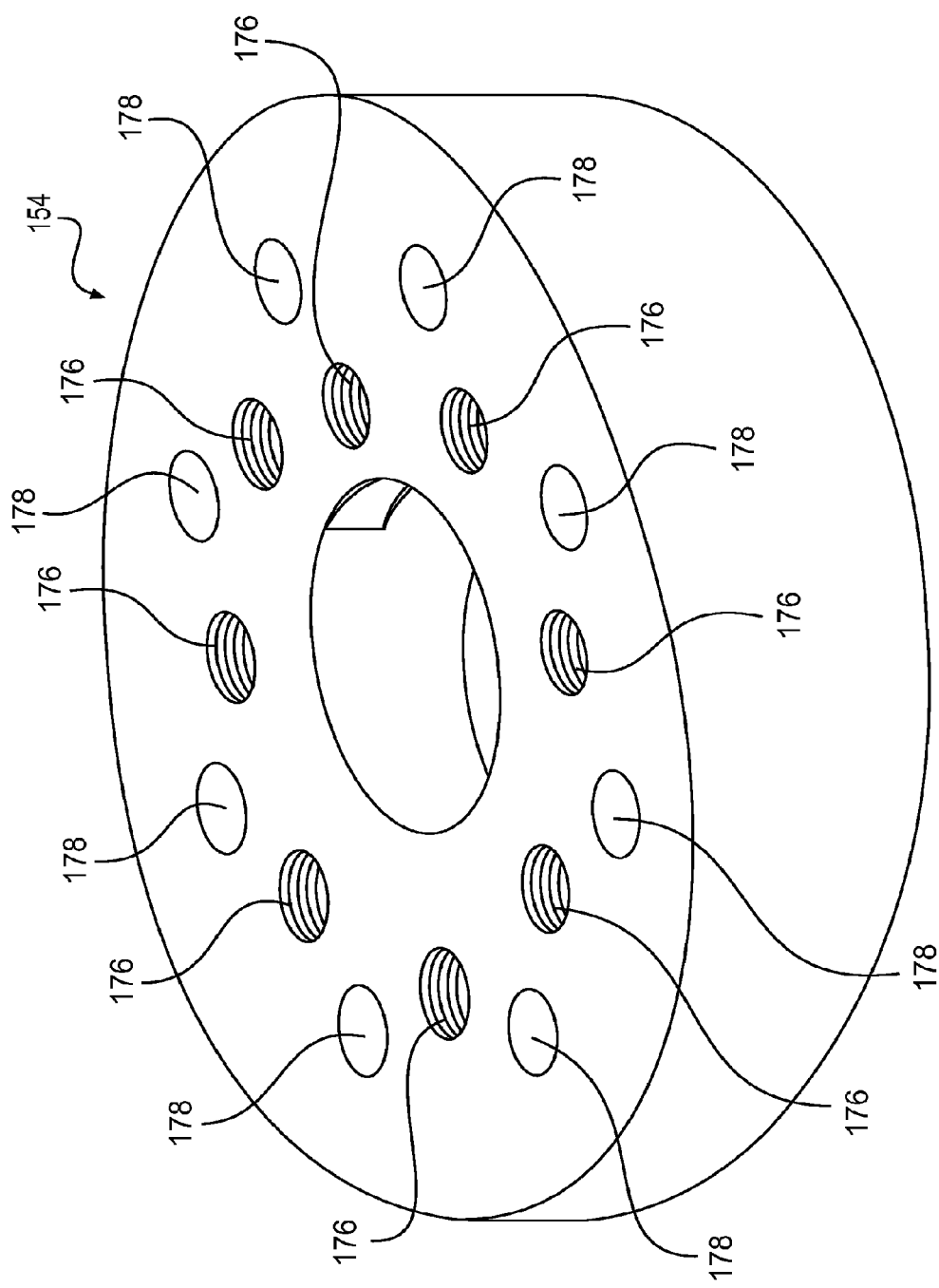
FIG. 28 is a perspective view of an outer boss of the pump mounting assembly of FIG. 24.
Figure 29:
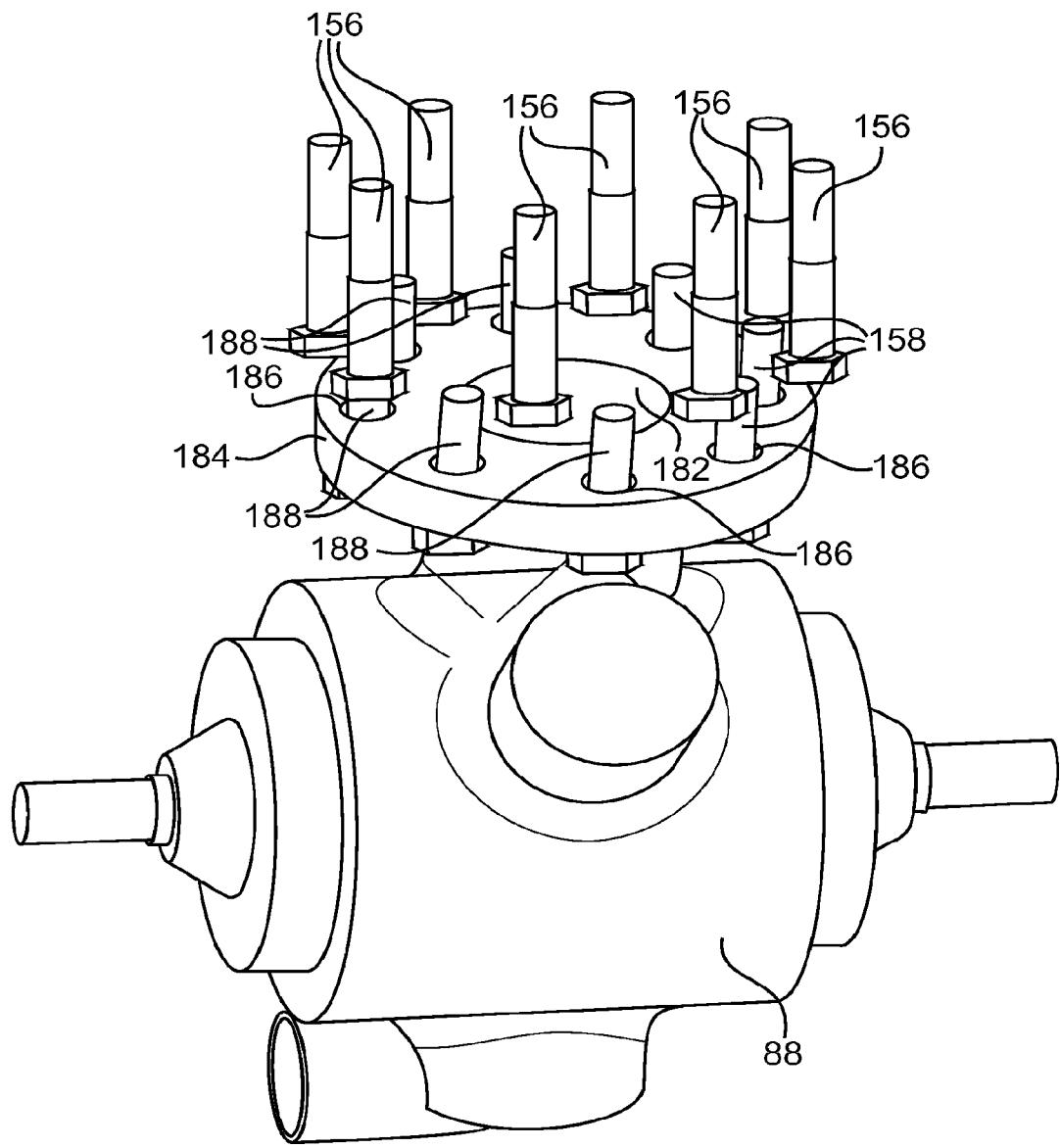
FIG. 29 is a perspective view of the pump of FIG. 24.

As best seen in FIG. 28, the outer boss 154 has a central aperture 174, a plurality of threaded apertures 176 disposed in a circle around the central aperture 174, and a plurality of apertures 178 disposed in a circle around the plurality of threaded apertures 176. As can be seen in FIG. 25, the apertures 178 are counterbored. A side 180 of the outer boss 154 which abuts the tank body 26 when it is mounted to the tank body 26 (i.e. the inner side of the outer boss 154) is curved so has to be complementary in shape to the portion of the tank body 26 which it abuts when mounted to the tank body 26 as can be seen in FIGS. 24 and 25. The opposite side of the outer boss 154 (i.e. the outer side of the outer boss 154) defines a generally flat surface. The central aperture 174 and the plurality of apertures 178 are arranged such that when the outer boss 154 is mounted to the tank body 26, each of the apertures 174, 178 is aligned with a corresponding one of the plurality of apertures cut in the tank body 26. The plurality of apertures 178 are also arranged so as to be aligned with the plurality of aperture 168 of the inner boss 152 and the plurality of threaded apertures 160 of the flange 150 when the pump mounting assembly 90 is mounted to the tank body 26. The outer boss 154 is made of carbon steel. However, it is contemplated that the outer boss 154 could be made of other types of metal or of plastic, such as fiber reinforced plastic.

To mount the pump mounting assembly 90 to the tank body 26, as seen in FIGS. 24 and 25, the flange 150 and inner boss 152 are disposed inside the tank body 26 such that the inner boss 152 abuts the liner 96 and such that the apertures 158, 160, 166 and 168 are aligned with their corresponding apertures in the tank body 26. The outer boss 154 is disposed outside the tank 26 such that its inner side 180 abuts the outer shell 98 and such that the apertures 174 and 178 are aligned with their corresponding apertures in the tank body 26. Once arranged in this manner, the apertures 160 of the flange 150, the apertures 168 of the inner boss 152, the corresponding apertures in the tank body 26, and the apertures 178 of the outer boss 154 are aligned and are generally coaxial with each other. This allows the fasteners 156 to be inserted in the apertures 160, 168, 178 and the corresponding apertures in the tank body 26 so as to engage the threads of the apertures 160. As can be seen in FIG. 25, the heads of the fasteners 156 are recessed in the outer boss 154 due to the counterbores of the apertures 178. Once the fasteners 156 are fastened, the outer boss 154, the tank body 26 and the inner boss 152 are compressed between the flange 150 and the heads of the fasteners 156. This creates a seal between the outer surface of the inner boss 152 and the liner 96, thus preventing fluid inside the tank body 26 from escaping via the interface between the inner boss 152 and the liner 96. It is contemplated that the inner boss 152 could also be welded or fused to the liner 96. As can be seen in FIGS. 24 and 25, once the pump mounting assembly 90 is mounted to the tank body 26, the central aperture 158 of the flange 150 and the central aperture 166 of the inner boss 152 are generally coaxial and their central axes are generally parallel to the central axes of the apertures 160, 168 and 178. The central axis of the central aperture 174 of the outer boss 154 is skewed relative to the central axes of the central apertures 158 and 166 so as to be properly aligned with an inlet aperture 182 of the pump 88 when the pump is mounted to the pump mounting assembly 90.

The pump 88 has a mounting flange 184 inside which a plurality of mounting flange apertures 186 is formed. The mounting flange apertures 186 are disposed in a circle around the inlet aperture 182. The mounting flange apertures 186 are arranged such that when the pump 88 is mounted to the pump mounting assembly 90, each of the mounting flange apertures 186 is aligned with a corresponding one of the threaded apertures 176 in the outer boss 154. To mount the pump 88 to the pump mounting assembly 90, the mounting flange 184 of the pump 88 is disposed so as to abut the outer flat surface of the outer boss 154 and such that the inlet aperture 182 of the pump 88 is aligned with the central aperture 174 of the outer boss 154 and the mounting flange apertures 186 are aligned with the threaded apertures 176 of the outer boss 154. A plurality of threaded fasteners 188 are then inserted in the plurality of mounting flange apertures 186 and the plurality of threaded apertures 176 of the outer boss 154 so as to engage the threads of the threaded apertures 176, thus fastening the pump 88 to the pump mounting assembly 90. In the present embodiment, the threaded fasteners 188 are bolts, however it is contemplated that other types of threaded fasteners could be used. It is contemplated that a gasket could be disposed between the mounting flange 184 of the pump and the outer boss 154. It is also contemplated that a structure of the type of the pump mounting assembly 90 could be used to mount elements other than a pump 88 to the tank body 26.

Turning now to FIGS. 30 to 37, a pump mounting assembly 200, which is an alternative embodiment of the pump mounting assembly 90, will be described. The pump mounting assembly 200 includes a flange 202, an inner boss 204, an outer boss 206, a pump mounting fitting 208 and a plurality of threaded fasteners 210. In the present embodiment, the threaded fasteners 210 are bolts, however it is contemplated that other types of threaded fasteners could be used. A plurality of apertures is cut in the tank body 26 to mount the pump mounting assembly 200.

Figure 33:
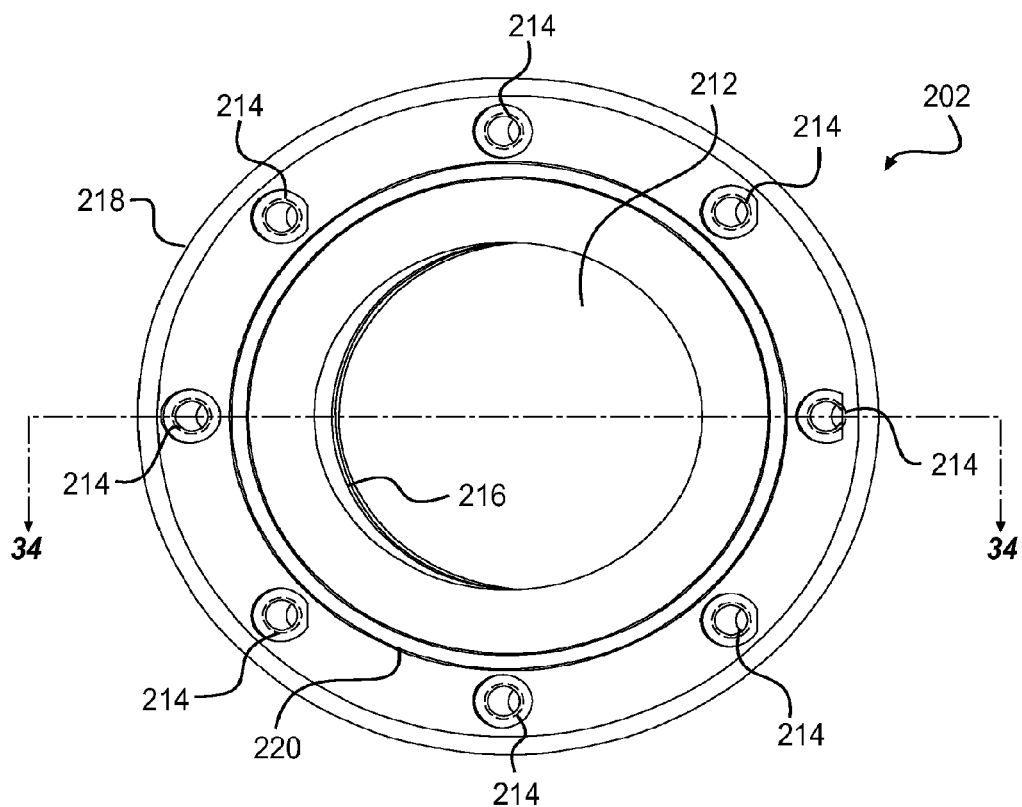
FIG. 33 is a perspective view of a flange of the pump mounting assembly of FIG. 32.
Figure 34:
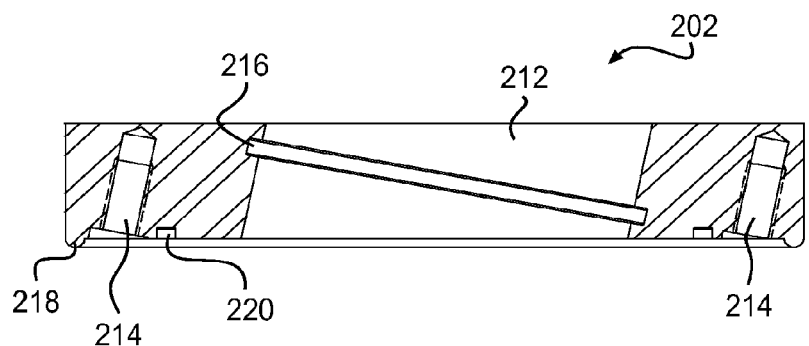
FIG. 34 is a cross-sectional view of the flange of FIG. 33 taken through line 34-34 of FIG. 33.

As best seen in FIGS. 33 and 34, the flange 202 has a central aperture 212 and a plurality of threaded bores 214 disposed in a circle around the central aperture 212. The central aperture 212 and the plurality of threaded bores 214 are arranged such that when the pump mounting assembly 200 is mounted to the tank body 26, the aperture 212 and each of the bores 214 are each aligned with a corresponding one of the plurality of apertures in the tank body 26. The flange 202 has an annular groove 216 formed in the side wall defined by the aperture 212. The flange 202 has an annular lip 218 disposed adjacent the outer perimeter of the flange 202 on the face of the flange 202 which faces the inner side of the tank body 26 when the flange 202 is installed in the tank body 26. It is contemplated that the annular lip 218 could be omitted. Another annular groove 220 is also formed on the same face of the flange 202 as the annular lip 218. The annular groove 220 is disposed radially between the central aperture 212 and the threaded bores 214. The flange 202 is made of carbon steel. However, it is contemplated that the flange 202 could be made of other types of metal or of plastic, such as fiber reinforced plastic.

Figure 35:
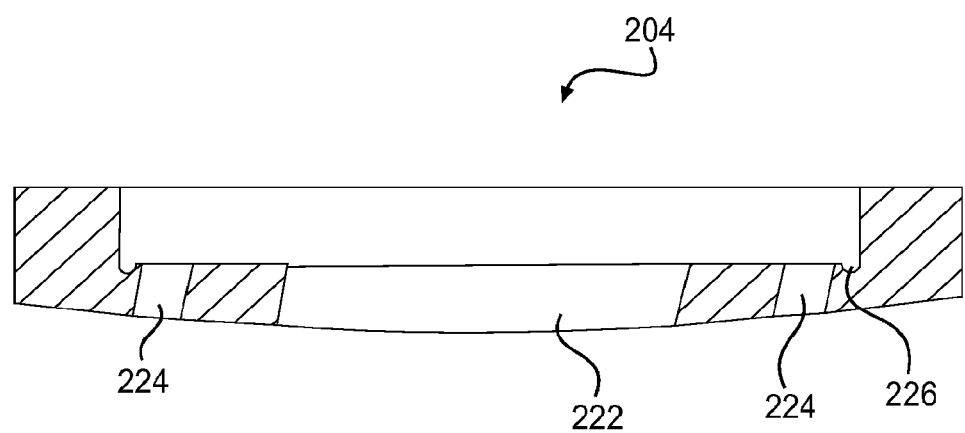
FIG. 35 is a cross-sectional view of an inner boss of the pump mounting assembly of FIG. 32.

As best seen in FIG. 35, the inner boss 204 has a central aperture 222 and a plurality of apertures 224 disposed in a circle around the central aperture 222. A side of the inner boss 204 which abuts the liner 96 when it is mounted to the tank body 26 (i.e. the outer side of the inner boss 204) is curved so has to be complementary in shape to the portion of the liner 96 which it abuts when mounted to the tank body 26 as can be seen in FIGS. 30 to 32. As seen in FIG. 35, the opposite side of the inner boss 204 (i.e. the inner side of the inner boss 204) has a recess formed therein around the aperture 222 to receive the flanges 202. The recess includes an annular groove 226 to receive the annular lip 218 of the flange 202. The central aperture 222 and the plurality of apertures 224 are positioned so as to be generally coaxial with the central aperture 212 and the plurality of bores 214 respectively when the flange 202 is disposed in the recess of the inner boss 204. The inner boss 204 is made of HDPE.

Prior to inserting the flange 202 into the recess of the inner boss 204, the flange 202 is heated. An O-ring 228 (FIG. 32) is then placed inside the annular groove 220. The flange 202 is then inserted in the recess of the inner boss 204. The heated flange 202 causes the portion of the inner boss 204 adjacent to the flange 202 to melt and fuse with the flange 202. This ensures that the interface between the flange 202 and the inner boss 204 is properly sealed. It is contemplated that, alternatively, the flange 202 could be bonded to the inner boss 204 by an adhesive. The lip 218 of the flange 202 and the O-ring 228, which is now retained between the flange 202 and the inner boss 204, also help ensure that no fluid will escape from inside the tank body 26 via the interfaces between the flange 202 and the inner boss 204 once the pump mounting assembly 200 is mounted to the tank body 26. It is contemplated that instead of or in addition to the O-ring 228, a plurality of O-rings could be disposed in a plurality of grooves formed around the bores 214 of the flange 202 to form seals around each of the apertures 224. As can be seen in FIGS. 31 and 32, the inner boss 204 abuts the circumference of the flange 202, thus increasing the length of the interface between the flange 202 and the inner boss 204.

As can be seen in FIGS. 31 and 32, the outer boss 206 has a central aperture 230 and a plurality of apertures 232 disposed in a circle around the central aperture 230. A side of the outer boss 206 which abuts the tank body 26 when it is mounted to the tank body 26 (i.e. the inner side of the outer boss 206) is curved so has to be complementary in shape to the portion of the tank body 26 which it abuts when mounted to the tank body 26 as can be seen in FIGS. 31 and 32. The opposite side of the outer boss 206 (i.e. the outer side of the outer boss 206) defines a generally flat surface. The central aperture 230 and the plurality of apertures 232 are arranged such that when the outer boss 206 is mounted to the tank body 26, each of the apertures 230, 232 is aligned with a corresponding one of the plurality of apertures cut in the tank body 26. In an exemplary embodiment, the apertures 230 and 232 are cut in the outer boss 206 at the same time as the apertures are cut in the tank body 26. The aperture 230 is also arranged so as to be generally coaxial with the aperture 222 of the inner boss 204 and the aperture 212 of the flange 202 when the pump mounting assembly 200 is mounted to the tank body 26. The plurality of apertures 232 is also arranged so as to be generally coaxial with the plurality of aperture 224 of the inner boss 204 and the plurality of threaded bores 214 of the flange 202 when the pump mounting assembly 200 is mounted to the tank body 26. The outer boss 206 is made of composite material and is bonded to the tank body 26. However, it is contemplated that the outer boss 206 could be made of metal or plastic, such as fiber reinforced plastic.

Figure 36:
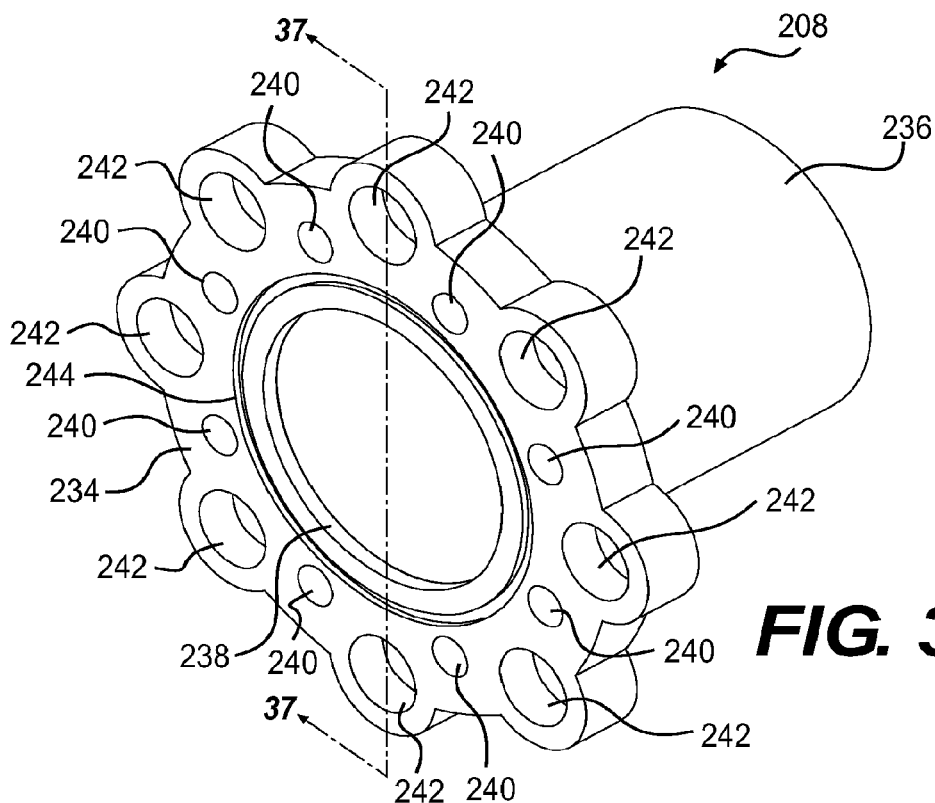
FIG. 36 is a perspective view of a pump mounting fitting of the pump mounting assembly of FIG. 32.
Figure 37:
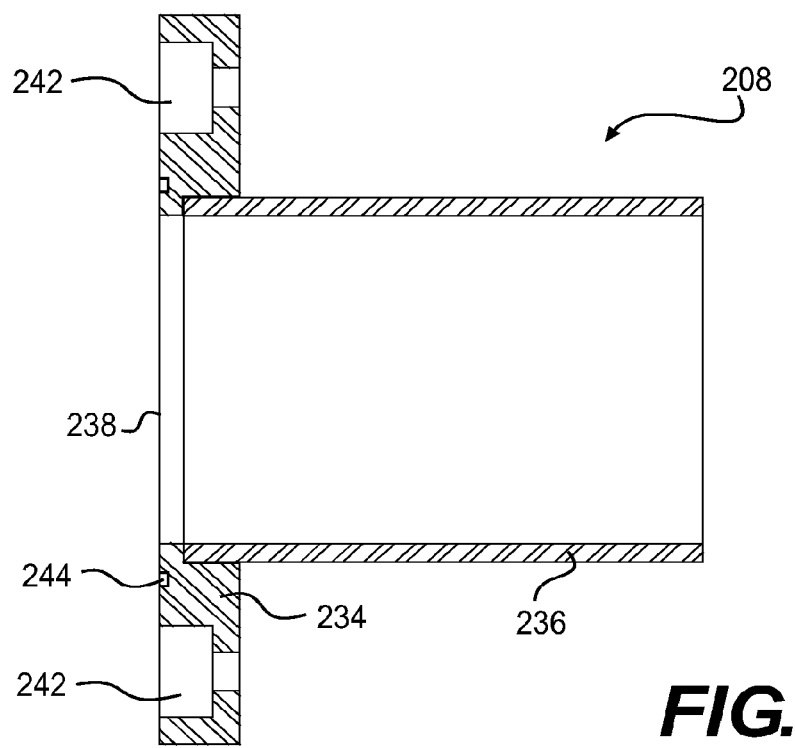
FIG. 37 is a cross-sectional view of the pump mounting fitting of FIG. 36 taken through line 37-37 of FIG. 36.

As best seen in FIGS. 36 and 37, the pump mounting fitting 208 includes a flange 234 connected to a tube 236. In an exemplary embodiment, the flange 234 and the tube 236 are made of steel and are welded together. However, it is contemplated that the flange 234 and the tube 236 could be made of other types of material and could be connected by other methods. The flange 234 has a central aperture 238 and a plurality of threaded aperture 240 disposed in a circle around the central aperture 238. The threaded apertures 240 are arranged such that when the pump 88 is mounted to the pump mounting assembly 200, the threaded apertures are generally coaxial with the mounting flange apertures 186 of the pump 88 and of corresponding apertures of an internal valve 241 provided between the pump 88 and the pump mounting assembly 200 as described in greater detail below. The flange 234 also has plurality of counterbored apertures 242 disposed in a circle radially further from a center of the flange 234 than the plurality of threaded aperture 240. As can be seen, the apertures 240 and 242 alternate in the circumferential direction of the flange 234. The central aperture 238 and the plurality of apertures 242 are arranged such that when the pump mounting assembly 200 is mounted to the tank body 26, each of the apertures 238, 242 is aligned with a corresponding one of the plurality of apertures in the tank body 26. The aperture 238 is also arranged so as to be generally coaxial with the aperture 230 of the outer boss 206, the aperture 222 of the inner boss 204 and the aperture 212 of the flange 202 when the pump mounting assembly 200 is mounted to the tank body 26. The plurality of apertures 242 is also arranged so as to be generally coaxial with the plurality of apertures 232 of the outer boss 206, the plurality of aperture 224 of the inner boss 204 and the plurality of threaded bores 214 of the flange 202 when the pump mounting assembly 200 is mounted to the tank body 26. The flange 234 has an annular groove 244 formed in the side wall defined by the aperture 212. An annular groove 244 is formed on the face of the flange 234 which faces away from the tank body 26 when the pump mounting fitting 208 is installed in the tank body 26. The annular groove 244 is disposed radially between the central aperture 238 and the threaded apertures 240.

To mount the pump mounting assembly 200 to the tank body 26, as seen in FIG. 32, the flange 202 and inner boss 204 are disposed inside the tank body 26 such that the inner boss 204 abuts the liner 96 and such that the apertures 212, 214, 222 and 224 are aligned with their corresponding apertures in the tank body 26. If not already done, the outer boss 206 is disposed outside the tank 26 such that its inner side abuts the outer shell 98 and such that the apertures 230 and 232 are aligned with their corresponding apertures in the tank body 26. An O-ring 246 (FIG. 32) is inserted in the groove 216 of the flange 202. The pump mounting fitting 208 is then installed by inserting the tube 236 in the apertures 230 of the outer boss 206, the corresponding aperture in the tank body 26, the aperture 222 of the inner boss 204 and the aperture 212 of the flange 202 until the flange 234 of the pump mounting fitting 208 abuts the outer surface of the outer boss 206. The O-ring 246 forms a seal around the tube 236 to prevent fluid in the tank to flow out of the tank body 26 around the tube 236. Belleville washers 248 are disposed around the fasteners 210 and the fasteners 210 are the inserted in the apertures 242, 232 and 224, the corresponding apertures in the tank body 26 and the threaded bores 214 so as to engage the threads of the bores 214. As can be seen in FIG. 32, the heads of the fasteners 210 are recessed in the flange 234 due to the counterbores of the apertures 242. Once the fasteners 210 are fastened, the outer boss 206, the tank body 26 and the inner boss 204 are compressed between the flange 234 and the flange 202. This creates a seal between the outer surface of the inner boss 204 and the liner 96, thus preventing fluid inside the tank body 26 from escaping via the interface between the inner boss 204 and the liner 96. It is contemplated that the inner boss 204 could also be welded or fused to the liner 96.

The mounting of the pump 88 and of the internal valve 241 to the pump mounting assembly 200 will now be described with respect to FIGS. 30 and 31. An O-ring 250 (FIG. 31) is inserted in the groove 244 of the flange 234 of the pump mounting fitting 208. The internal valve 241 is inserted the tube 236 of the pump mounting fitting 208 until a flange 252 of the internal valve abuts the flange 234 of the pump mounting fitting 208. The pump 88 is disposed so as to abut the end of the valve 241. A plurality of threaded fasteners 254 are then inserted in the plurality of mounting flange apertures 186 of the pump, corresponding aperture in the flange 252 of the valve 241, and the plurality of threaded apertures 240 of the pump mounting fitting 208 so as to engage the threads of the threaded apertures 240, thus fastening the pump 88 and the valve 241 to the pump mounting assembly 200. When the fasteners 254 are tightened, the O-ring 250 forms a seal between the flange 252 of the valve 241 and the flange 234 of the pump mounting fitting 208 to prevent fluid inside the tank body 26 from escaping between the pump mounting fitting 208 and the internal valve 241. In the present embodiment, the threaded fasteners 254 are bolts, however it is contemplated that other types of threaded fasteners could be used. It is also contemplated that a structure of the type of the pump mounting assembly 200 could be used to mount elements other than a pump 88 and a valve 241 to the tank body 26.

Since the inner bosses 130A, 130B, 140, 152 and 204 are made of HDPE, which is the same material as the liner 96, the inner bosses 130A, 130B, 140, 152 and 204 and the liner 96 have the same thermal coefficient of expansion, thus ensuring that a good seal is formed between the inner bosses 130A, 130B, 140, 152 and 204 and the liner 96 regardless of temperature variations. It is contemplated that the inner bosses 130A, 130B, 140, 152 and 204 could be made of a different type of polymer. However, the materials selected to make the inner bosses 130A, 130B, 140, 152 and 204 and the liner 96 should have the same or similar thermal coefficients of expansion.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A transport tank for mounting to a truck comprising:
a composite tank body having an inner side and an outer side, the tank body having a tank aperture defined therein;
an outer boss mounted to the outer side of the tank body, the outer boss having an outer boss aperture defined therein, the outer boss aperture being aligned with the tank aperture;
an inner boss mounted to the inner side of the tank body, the inner boss having an inner boss aperture defined therein, the inner boss aperture being aligned with the tank aperture and the outer boss aperture;
a fitting having a fitting body and a flange connected to the fitting body, the flange having an annular lip extending toward the inner side of the tank body, the annular lip being received in a corresponding annular groove in the inner boss and the fitting body extending through the inner boss aperture, the tank aperture, and the outer boss aperture,
at least a portion of the inner boss being disposed between the inner side of the tank body and the flange, the portion of the inner boss abutting the inner side of the tank and the flange,
the fitting body having an end disposed outside the tank body, an outer surface of the end being at least partially threaded; and
a nut fastened onto the at least partially threaded end of the fitting body such that the outer boss, the tank body, and the inner boss are compressed between the nut and the flange.

2. The tank of claim 1, wherein:
the outer boss has an inner side facing the tank body and an outer side facing away from the tank body;
a portion of the outer side of the tank body adjacent the outer boss is curved; the inner side of the outer boss is curved and is complementary in shape to the portion of the outer side of the tank body;
the outer side of the outer boss defines a generally flat surface; and the nut abuts the generally flat surface.

3. The tank of claim 1, wherein:
the inner boss has an outer side facing the tank body and an inner side opposite the outer side;
a portion of the inner side of the tank body adjacent the inner boss is curved; and
the outer side of the inner boss is curved and is complementary in shape to the portion of the inner side of the tank body.

4. The tank of claim 1, wherein the flange has an annular groove;
the tank further comprising one of an o-ring and a face seal disposed in the groove of the flange, the one of the o-ring and the face seal being disposed between the flange and the inner boss.

5. The tank of claim 1, wherein the inner boss abuts a circumference of the flange.

6. The tank of claim 1, wherein:
the tank aperture is a first tank aperture;
the outer boss aperture is a first outer boss aperture;
the inner boss aperture is a first inner boss aperture;
the fitting is a first fitting;
the nut is a first nut;
the composite tank body has a second tank aperture defined therein;
the outer boss has a second outer boss aperture defined therein, the second outer boss aperture being aligned with the second tank aperture; and
the inner boss has a second inner boss aperture defined therein, the second inner boss aperture being aligned with the second tank aperture and the second outer boss aperture;
the tank further comprising:
a second fitting having a fitting body and a flange connected to the fitting body,
the fitting body of the second fitting extending through the second inner boss aperture, the second tank aperture, and the second outer boss aperture,
at least an other portion of the inner boss being disposed between the inner side of the tank body and the flange of the second fitting, the other portion of the inner boss abutting the inner side of the tank and the flange of the second fitting,
the fitting body of the second fitting having an end disposed outside the tank body, an outer surface of the end being at least partially threaded; and
a second nut fastened onto the at least partially threaded end of the fitting body of the second fitting such that the outer boss, the tank body, and the inner boss are compressed between the second nut and the flange of the second fitting.

7. The tank of claim 1, wherein the inner boss is fused to the fitting.

8. The tank of claim 1, wherein the tank body includes a liner disposed inside an outer shell, the outer shell being made of composite material; and wherein the inner boss and the liner have identical thermal coefficients of expansion.

9. The tank of claim 1, wherein the fitting body is a tubular body.

10. The tank of claim 1, wherein the tank body includes a liner disposed inside an outer shell, the outer shell being made of composite material; and wherein the inner boss and the liner are made of the same material.

11. The tank of claim 10, wherein the material is a polymer.

12. A transport tank for mounting to a truck comprising:
a composite tank body having an inner side and an outer side, the tank body having a first tank aperture and a second tank aperture defined therein;
an outer boss mounted to the outer side of the tank body, the outer boss having a first outer boss aperture and a second outer boss aperture defined therein, the first outer boss aperture being aligned with the first tank aperture and the second outer boss aperture being aligned with the second tank aperture;
an inner boss mounted to the inner side of the tank body, the inner boss having a first inner boss aperture and a second inner boss aperture defined therein, the first inner boss aperture being aligned with the first tank aperture and the first outer boss aperture and the second inner boss aperture being aligned with the second tank aperture and the second outer boss aperture;
a first fitting having a fitting body formed as a tube with central aperture and an outer surface and a flange connected to the outer surface, the fitting body extending through the first inner boss aperture, the first tank aperture, and the first outer boss aperture,
at least a portion of the inner boss being disposed between the inner side of the tank body and the flange, the portion of the inner boss abutting the inner side of the tank and the flange,
the fitting body having an end disposed outside the tank body, an outer surface of the end being at least partially threaded;
a first nut fastened onto the at least partially threaded end of the fitting body such that the outer boss, the tank body, and the inner boss are compressed between the first nut and the flange;
a second fitting having a tubular body and a flange extension extending from the body, the body of the second fitting extending through the second inner boss aperture, the second tank aperture, and the second outer boss aperture;
at least an other portion of the inner boss being disposed between the inner side of the tank body and the flange extension of the second fitting, the other portion of the inner boss abutting the inner side of the tank and the flange extension of the second fitting;
the body of the second fitting having a threaded end disposed outside the tank body, an outer surface of the threaded end being at least partially threaded; and
a second nut fastened onto the threaded end of the second fitting such that the outer boss, the tank body, and the inner boss are compressed between the second nut and the flange extension of the second fitting.

* * * * *